US012634958B2

(12) United States Patent
Shi et al.

(10) Patent No.: US 12,634,958 B2
(45) Date of Patent: May 19, 2026

(54) PDCCH CONFIGURATION METHOD, TERMINAL DEVICE AND STORAGE MEDIUM

(71) Applicant: GUANGDONG OPPO MOBILE TELECOMMUNICATIONS CORP., LTD., Dongguan (CN)

(72) Inventors: Zhihua Shi, Dongguan (CN); Yun Fang, Dongguan (CN); Wenhong Chen, Dongguan (CN)

(73) Assignee: GUANGDONG OPPO MOBILE TELECOMMUNICATIONS CORP., LTD., Donnguan (CN)

( * ) Notice: Subject to any disclaimer, the term of this patent is extended or adjusted under 35 U.S.C. 154(b) by 313 days.

(21) Appl. No.: 18/451,723

(22) Filed: Aug. 17, 2023

(65) Prior Publication Data

US 2023/0397228 A1    Dec. 7, 2023

Related U.S. Application Data

(63) Continuation of application No. PCT/CN2021/082774, filed on Mar. 24, 2021.

(51) Int. Cl.
*H04W 72/232*        (2023.01)
*H04L 5/00*          (2006.01)

(52) U.S. Cl.
CPC ......... *H04W 72/232* (2023.01); *H04L 5/0094* (2013.01)

(58) Field of Classification Search
CPC ........... H04W 72/232; H04W 72/0446; H04W 72/231; H04L 5/0094; H04L 5/0023; H04L 5/0053; H04B 7/0639; H04B 7/066
(Continued)

(56) References Cited

U.S. PATENT DOCUMENTS

2019/0222357 A1    7/2019  Huang et al.
2019/0342907 A1    11/2019 Huang et al.
(Continued)

FOREIGN PATENT DOCUMENTS

CA    3105895     1/2020
CN    109644082   4/2019
(Continued)

OTHER PUBLICATIONS

CNIPA, Notice of Priority Examination for CN Application No. 202311416592.0, Oct. 23, 2024.
(Continued)

*Primary Examiner* — Candal Elpenord
(74) *Attorney, Agent, or Firm* — Hodgson Russ LLP

(57)        ABSTRACT

Provided in the embodiments of the present invention are a physical downlink control channel (PDCCH) configuration method, a terminal device and a storage medium, which are used for realizing multi-TRP enhancement of a PDCCH. The embodiments of the present invention may comprise: a first terminal device receiving first configuration information sent by a first device, wherein the first configuration information indicates N first search spaces; PDCCHs corresponding to the N first search spaces are associated with each other, and/or the N first search spaces are associated with each other; the N first search spaces correspond to the PDCCHs; and N is an integer greater than or equal to 2.

13 Claims, 3 Drawing Sheets

(58) Field of Classification Search
USPC ................................................ 370/329–330
See application file for complete search history.

(56) References Cited

U.S. PATENT DOCUMENTS

| | | | |
|---|---|---|---|
| 2020/0076556 A1 | 3/2020 | Takahashi et al. | |
| 2020/0413412 A1 | 12/2020 | Kim et al. | |
| 2021/0195601 A1* | 6/2021 | Khoshnevisan | H04W 72/53 |
| 2022/0330301 A1* | 10/2022 | Huang | H04L 5/0044 |
| 2023/0076897 A1* | 3/2023 | Svedman | H04L 5/0053 |
| 2023/0085875 A1 | 3/2023 | Li | |
| 2023/0091462 A1* | 3/2023 | Babaei | H04W 72/23 |
| | | | 370/329 |
| 2023/0112271 A1* | 4/2023 | Kim | H04L 1/08 |
| | | | 370/329 |
| 2023/0217460 A1* | 7/2023 | Zhang | H04B 7/06952 |
| | | | 370/329 |
| 2024/0089986 A1* | 3/2024 | Matsumura | H04W 72/0446 |
| 2025/0142569 A1* | 5/2025 | MolavianJazi | H04W 72/20 |

FOREIGN PATENT DOCUMENTS

| | | |
|---|---|---|
| CN | 110474751 | 11/2019 |
| CN | 110740025 | 1/2020 |
| CN | 110944341 | 3/2020 |
| CN | 111148260 | 5/2020 |
| CN | 111279778 | 6/2020 |
| CN | 111431685 | 7/2020 |
| CN | 111527722 | 8/2020 |
| WO | 2019099393 | 5/2019 |
| WO | 2021034086 | 2/2021 |

OTHER PUBLICATIONS

CNIPA, First Office Action for CN Application No. 202311416592. 0, Nov. 15, 2024.
EPO, Extended European Search Report for EP Application No. 21932132.0, Apr. 5, 2024.
Qualcomm, "Discussion Summary for mTRP PDCCH Reliability Enhancements," 3GPP TSG-RAN WG1 Meeting #104-e, R1-2101838, Jan. 2021.
MCC TF160, "Add new verified and e-mail agreed TTCN test cases in the TC lists in 38.523-3 (prose), Annex A," 3GPP TSG-RAN5 Meeting #2021-TTCN email, R5s210319, Dec. 2020.
WIPO, International Search Report and Written Opinion for PCT/ CN2021/082774, Dec. 13, 2021.
Qualcomm Incorporated, "Enhancements on Multi-TRP for PDCCH, PUCCH and PUSCH," 3GPP TSG-RAN WG1 Meeting #103-e, R1-2009251, Oct. 2020.
Oppo, "Enhancements on Multi-TRP for PDCCH, PUCCH and PUSCH," 3GPP TSG RAN WG1 #103-e, R1-2008218, Oct. 2020.
Samsung, "Enhancements on Multi-TRP for PDCCH, PUCCH and PUSCH," 3GPP TSG RAN WG1 #103-e, R1-2008149, Oct. 2020.
"3rd Generation Partnership Project; Technical Specification Group Radio Access Network; NR; Radio Resource Control (RRC) protocol specification (Release 17)," 3GPP TS 38.331, Jun. 2023, v17.5.0.
VIVO, "Enhancements on Multi-TRP for PDCCH, PUCCH and PUSCH," 3GPP TSG RAN WG1 #104-e, R1-2100422, Jan. 2021.
EPO, Communication for EP Application No. 21932132.0, Feb. 26, 2025.

* cited by examiner

TRP 1          TRP 2                          gNB
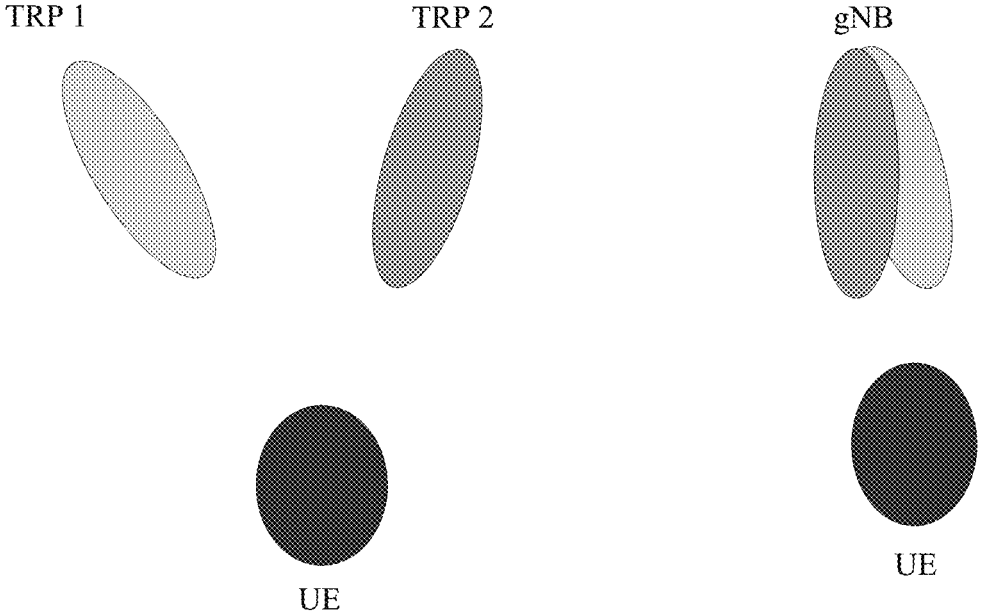
UE
FIG. 1A                                  FIG. 1B
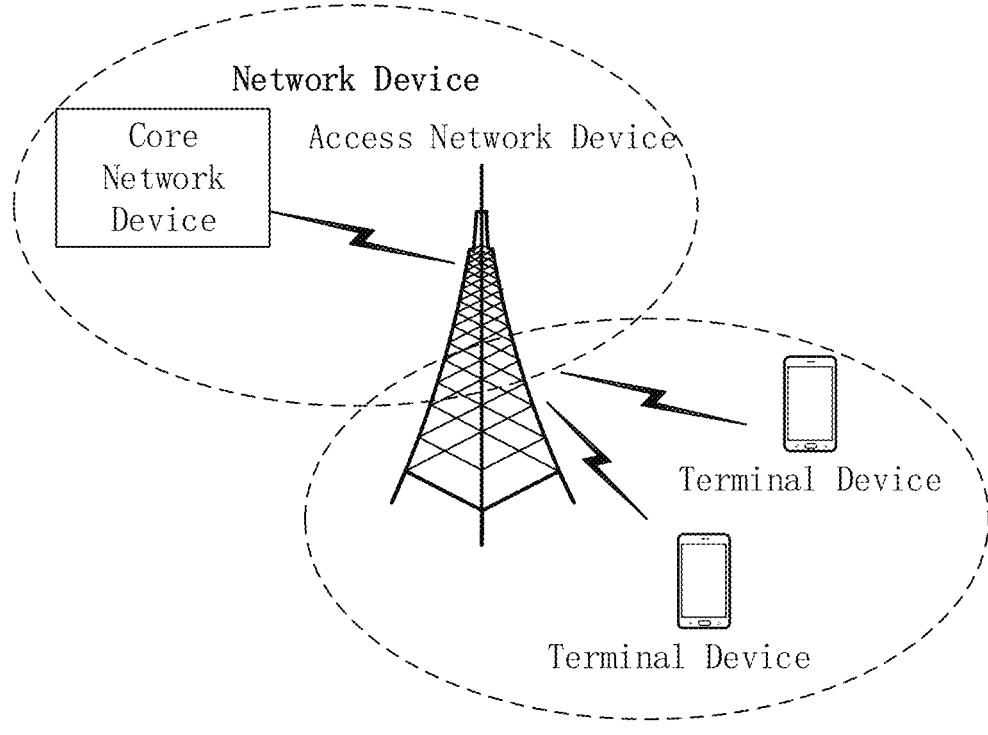
FIG. 2

PDCCH CONFIGURATION METHOD, TERMINAL DEVICE AND STORAGE MEDIUM

CROSS REFERENCE

The present application is a continuation of International Application No. PCT/CN2021/082774, filed Mar. 24, 2021, the entire disclosure of which is incorporated herein by reference.

TECHNICAL FIELD

The present disclosure relates to the communication field, and in particular to a PDCCH configuration method, a terminal device and a storage medium.

BACKGROUND

For multiple transmission/reception point (TRP) transmission, the New Radio (NR) Rel-16 protocol only supports the solution that multiple TRPs simultaneously transmit downlink data to UE. The scheme of sending a downlink control information (DCI) from multiple TRPs to the same user equipment (UE) has not been introduced yet. Next, the multi-TRP enhancement scheme of the physical downlink control channel (PDCCH) will be studied. Currently, the 3rd Generation Partnership Project (3GPP) is discussing the detailed scheme of PDCCH multi-TRP transmission.

SUMMARY

Embodiment of the present disclosure provides a PDCCH configuration method, a terminal device and a storage medium.

The first aspect of the embodiments of the present disclosure provides a PDCCH configuration method, which may include: the a terminal device receives first configuration information sent by a first device, the first configuration information indicates N first search spaces, physical downlink control channels PDCCHs corresponding to the N first search spaces are associated with each other, and/or the N first search spaces are associated with each other, and the N first search spaces correspond to the PDCCH, wherein N is an integer greater than or equal to 2.

The second aspect of the embodiments of the present disclosure provides a terminal device, which has a function of receiving first configuration information sent by a first device, the first configuration information indicates N first search spaces, physical downlink control channels PDCCHs corresponding to the N first search spaces are associated with each other, and/or the N first search spaces are associated with each other, the N first search spaces correspond to the PDCCH, and N is an integer greater than or equal to 2. This function may be implemented by hardware, or may be implemented by executing corresponding software on the hardware. The hardware or software includes one or more modules corresponding to the above functions.

Another aspect of the embodiments of the present disclosure provides a terminal device, including: a memory storing an executable program code; a transceiver and a processor coupled to the memory; the processor and the transceiver are configured to execute the method described in the first aspect of the embodiments of the present disclosure.

Still another aspect of the embodiments of the present disclosure provides a computer-readable storage medium, including instructions, which, when run on a computer, cause the computer to execute the method described in the first aspect of the present disclosure.

Another aspect of the embodiments of the present disclosure provides a chip, the chip is coupled to a memory in a terminal device, so that the chip calls program instructions stored in the memory during operation, to cause the terminal device to execute the method described in the first aspect of the present disclosure.

BRIEF DESCRIPTION OF THE DRAWINGS

FIG. 1A is a schematic diagram of multiple TRP transmissions;

FIG. 1B is a schematic diagram of multiple beam transmissions;

FIG. 2 is a system architecture diagram of a communication system applied in the embodiment of the present disclosure;

DETAILED DESCRIPTION

Figure 3:
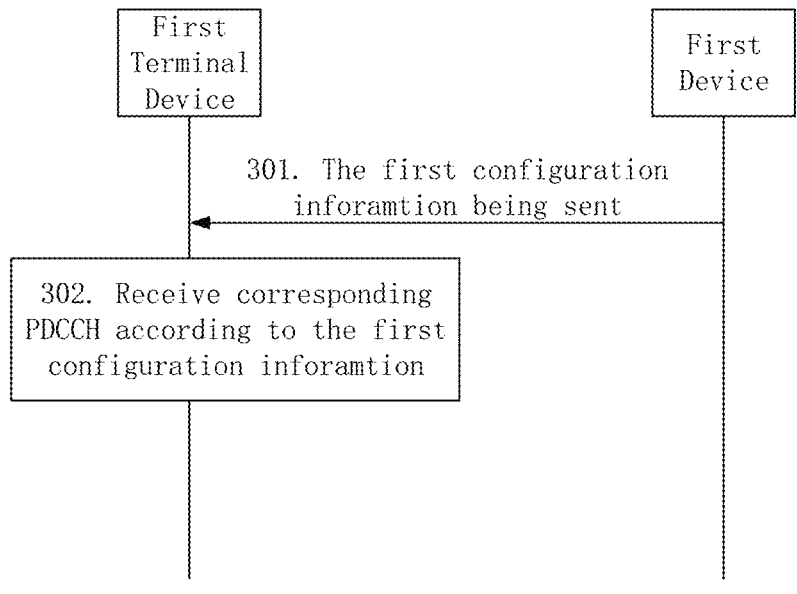
FIG. 3 is a schematic diagram of an embodiment of a method for PDCCH configuration in the embodiment of the present application.

Hereinafter, implementations in the embodiments of the present disclosure will be described with reference to the accompanying drawings in the embodiments of the present disclosure. Obviously, the described embodiments are only some of the embodiments of the present disclosure, not all of the embodiments. Based on the embodiments of the present disclosure, all other embodiments obtained by those skilled in the art without creative efforts fall within the protection scope of the present disclosure.

The terms involved in the embodiments of the present application are briefly described below, as follows:

1. Multi-Beam System

The design goals of the New Radio (NR)/5G system include large-bandwidth communications in high-frequency bands (e.g., frequency bands over 6 GHz). When the operating frequency becomes higher, the path loss in the transmission process will increase, thereby affecting the coverage capability of the high-frequency system. In order to effectively ensure the coverage of high-frequency NR systems, an effective technical scheme is to use multiple beams (such as analog beams) based on massive MIMO arrays, and hybrid beam technology to improve coverage.

In the existing 2/3/4G typical system, a cell (sector) uses a wide beam to cover the entire cell. Therefore, at each moment, every user equipment (UE) within the coverage of the cell has an opportunity to obtain transmission resources allocated by the system.

The NR/5G Multi-beam system covers the entire cell through different beams, that is, each beam covers a small range, and the effect of multiple beams covering the entire cell is achieved through sweeping at different times. At present, different beams are identified by different signals carried thereon.

(1) Different synchronization signal blocks (Synchronization signal/PBCH block, SS block) are transmitted on some different beams, and the UE can identify different beams through different SS blocks. SS block can also be referred to as SSB, SS/PBCH block.

(2) Different channel state information reference signals (CSI-RS) are transmitted on some different beams, and the UE identifies different beams through the CSI-RS signal/CSI-RS resource.

Therefore, the following discussion is based on the visible signal to implicitly indicate the beam carrying the signal transmission/reception.

In a multi-beam system, a physical downlink control channel (PDCCH) and a physical downlink shared channel (PDSCH) can be transmitted through different downlink transmission beams.

For systems below 6G, there is generally no analog beam on the UE side, so omnidirectional antennas (or near-omnidirectional antennas) are used to receive signals sent by different downlink transmission beams of the base station.

For the millimeter wave system, there may be analog beams on the UE side, and the corresponding downlink receive beams need to be used to receive signals sent by the corresponding downlink transmit beams. At this time, corresponding beam indication information (beam indication) is needed to assist the UE to determine the related information of the transmitting beam on the network side, or the corresponding receiving beam related information on the UE side.

In the NR protocol, the beam indication information does not directly indicate the beam itself, but uses quasi co-location (QCL) between signals (for example, through the 'QCL-TypeD' type) for indication. On the UE side, determining to receive the corresponding channel/signal is also based on the QCL quasi-co-location assumption. The QCL quasi-co-location assumption is indicated by a transmission configuration indicator (TCI) state (TCI-state), that is, the TCI status of the pair is configured and/or indicated by the network device using relevant signaling such as Radio Resource Control (RRC), and/or media access control element (MAC CE), and/or downlink control information (DCI).

2. Multi-Transmission/Reception Point (TRP)/Panel/Beam Transmission

Multi-TRP transmission means that on the same carrier, multiple TRPs can communicate with a certain terminal at the same time. Since in the NR system, multiple TRP transmissions, or multiple panels or multiple beams can transmit with one terminal at the same time, the same scheme can be used, so in the description, they are often not distinguished (for example, they are collectively referred to as multiple TRP transmission, or referred to as multiple TRP/panel/beam transmission).

In NR/5G In Rel-16, the scheme of transmitting DL data to the UE using multiple TRPs or multiple antenna panels or multiple beams supports the two types of schemes:

Alt1: single-PDCCH based scheme. The UE only detects one NR-PDCCH, and one DCI detected by the control channel PDCCH indicates the relevant indication information of data transmitted simultaneously on multiple TRP/panel/beam (from the protocol level, it is not visible that there are multiple TRP/panel/beams, but is visible that one transmission needs to correspond to multiple TCI-states, that is, multiple TRP/panel/beam transmissions are implicitly supported through multiple TCI-states).

Alt2: multiple-PDCCH based scheme. The UE receives different NR-PDCCHs from different TRP/panel/beams, and the DCI detected on each control channel PDCCH indicates a corresponding indication of data transmission (from the protocol level, it is not visible that there are multiple TRP/panel/beams, and is only visible that the control resource set (CORESET) corresponds to the DCI for scheduling the data may be associated with different CORESET resource pools index, i.e., corresponding to different CORESET pool index, that is, multiple different CORESET pool index are used to implicitly support multiple TRP/panel/beam transmissions).

As shown in FIG. 1A, it is a schematic diagram of multiple TRP transmissions. As shown in FIG. 1B, it is a schematic diagram of multiple beam transmission.

For the first scheme (Alt 1), the UE only needs to detect one NR-PDCCH, so the control channel detection complexity may be lower than the second scheme. The first solution needs to be able to quickly exchange information between different panels/TRP/beam.

For the second scheme (Alt2), the UE needs to simultaneously detect multiple NR-PDCCHs on the same carrier, and the complexity may increase, but the flexibility and robustness may be improved.

The possible application scenarios of the second solution (Alt2) include at least the following:

S1-1: Multiple TRPs belong to the same cell, and the connection (backhaul) between TRPs is ideal (that is, information exchange can be performed quickly and dynamic information exchange);

S1-2: Multiple TRPs belong to the same cell, and the connection (backhaul) between TRPs is not ideal (that is, TRPs cannot quickly exchange information, but can only perform relatively slow data exchange);

S1-3: Multiple TRPs belong to different cells, and the connection (backhaul) between TRPs is ideal; and S1-4: Multiple TRPs belong to different cells, and the connection (backhaul) between TRPs is not ideal.

S2-1, S2-2, S2-3, S2-4: Replace the corresponding TRP above with beam, and four multi-beam application scenarios can be obtained correspondingly. The first scheme is generally considered to be only applicable to ideal backhaul scenarios (i.e., S1-1, and S1-3).

It should be noted that: in the above description, for the multi-TRP system, Rel-16 only standardized the downlink data transmission (PDSCH) scheme. For the multi-TRP system, the transmission schemes discussed above are all for the case of the same carrier. For example, for the multiple-PDCCH based scheme, the terminal detects multiple DCIs on the same carrier (the existing protocol supports 2 DCIs), wherein each DCI can schedule the corresponding PDSCH, and multiple PDSCHs are also on the same carrier.

The present implementation proposes an enhancement solution for PDCCH transmission for a multi-TRP system.

3. Existing Schemes for NR Control Channels (R15, R16)

The network side indicates the transmission of the PDCCH by configuring a control resource set (CORESET) and a search space (Search Space). It is understandable that the search space can also be referred to as search space set. The control resource set includes multiple physical resource blocks in the frequency domain, and includes 1 to 3 OFDM symbols in the time domain. The time-domain resources occupied by the CORESET are semi-statically configured by high-level parameters. The search space is a collection of candidate PDCCHs (PDCCH candidates) under one or more aggregation levels. The aggregation level of the PDCCH actually sent by the base station is determined by the base station. Since there is no relevant signaling to notify the UE, the UE needs to blindly detect PDCCHs at different aggregation levels. The PDCCH to be blindly detected is referred to as a candidate PDCCH. The UE will decode the candidate PDCCH in the search space, and if the cyclic redundancy check (CRC) check is passed, the content of the decoded PDCCH is considered to be valid for the UE, and the information obtained by decoding is used for subsequent operations.

In NR, in each downlink bandwidth part (BWP) of each serving cell, the network side can configure up to 10 search space sets for the user, and the time domain configuration information is configured in the search space set to indicate the time domain position where the user detects the PDCCH. At the same time, the network side configures a set-associated CORESET ID for each search space set, and the user can obtain the physical resources of the search space set in the frequency domain through the CORESET ID. Each of search space set has a uniquely associated CORESET ID. Different of search space sets can be associated to the same CORESET ID. The UE determines the time-frequency domain position of the PDCCH candidate according to the time domain given by the search space set, the frequency domain of the associated CORESET ID, and other parameters in the search space set.

When configuring CORESETs, the network configures one or more TCI states for each CORESET, and the TCI states are used to indicate the relevant parameters required by the user for demodulation and detection of the PDCCH candidate of the search space associated with the CORESET. When the network configures multiple TCI states for a CORESET, the network will activate a TCI state for the CORESET through MAC CE signaling to assist the UE in demodulating the PDCCH.

In addition, the network also configures an identifier (higher layer index) for each CORESET to indicate whether it is the high-level configuration of the same CORESET pool (i.e., the CORESET pool index, the corresponding name in RRC is coresetPoolIndex). The value range is 0 and 1. During implementation, one CORESET pool can correspond to one TRP. For example, for CORESET configured with the same higher layer index, the user considers that the data is from the same TRP. Note that from the protocol, it is only visible whether different CORESET pool index is associated, while is not visible the physical entity of the TRP.

4. QCL Quasi-Co-Location Indication/Assumption for Downlink Transmission

When the terminal performs signal reception, in order to improve the reception performance, the characteristics of the transmission environment corresponding to the data transmission can be used to improve the reception algorithm. For example, the statistical properties of the channel can be used to optimize the design and parameters of the channel estimator. In the NR system, these characteristics corresponding to data transmission are represented by QCL status (QCL-Info).

If the downlink transmission comes from different TRP/panel/beam, the characteristics of the transmission environment corresponding to the data transmission may also change. Therefore, in the NR system, when the network side is transmitting the downlink control channel or data channel, it will indicate the corresponding QCL status information to the terminal through the TCI status.

1. A TCI status can contain the following configurations:
   1) TCI status ID, used to identify a TCI status;
   2) QCL information 1
   3) QCL information 2 (optional)

2. In the embodiment, a QCL information further includes the following information:
   1) QCL type configuration, which can be one of QCL type-A, QCL-typeB, QCL-typeC or QCL-typeD; and
   2) QCL reference signal configuration, including the cell ID where the reference signal is located, the BWP ID and the identification of the reference signal (which can be a CSI-RS resource ID or SSB index);

In the embodiment, if both QCL information 1 and QCL information 2 are configured, the QCL type of at least one QCL information must be one of typeA, typeB, and typeC, and the QCL type of the other QCL information (if configured) must be QCL typeD.

In the embodiment, the definitions of different QCL type configurations are as follows:
   'QCL-TypeA': {Doppler shift, Doppler spread, average delay, delay spread}
   'QCL-TypeB': {Doppler shift, Doppler spread}
   'QCL-TypeC': {Doppler shift, average delay}
   'QCL-TypeD': {Spatial Rx parameter}

In the existing 38.331, the corresponding configuration is as follows:

```
TCI-State ::=          SEQUENCE {
    tci-StateId           TCI-StateId
    qcl-Type1             QCL-Info,
    qcl-Type2             QCL-Info          OPTIONAL,   -- Need R
    ...
}
QCL-Info ::=          SEQUENCE {
    cell                  ServCellIndex     OPTIONAL,   -- Need R
    bwp-Id                BWP-Id            OPTIONAL, -- Cond
CSI-RS-Indicated
    referenceSignal       CHOICE {
       csi-rs                NZP-CSI-RS-ResourceId,
       ssb                   SSB-Index
    },
    qcl-Type              ENUMERATED {typeA, typeB, typeC, typeD},
    ...
}
```

In the description of the present disclosure, the QCL-TypeA, QCL-TypeB, QCL-TypeC, and QCL-TypeD are often abbreviated as typeA, typeB, typeC, and typeD.

In the NR system, the network side can indicate the corresponding TCI status for the downlink signal or downlink channel.

If the network side configures the target downlink channel or the QCL reference signal of the target downlink signal as a reference SSB or reference CSI-RS resource through the TCI status, and the QCL type is configured as typeA, typeB or typeC, then the terminal can assume that the target downlink signal is the same as the large-scale parameter of the reference SSB or reference CSI-RS resource, and the large-scale parameter is determined through QCL type configuration.

Similarly, if the network side configures the QCL reference signal of the target downlink channel or downlink signal as a reference SSB or reference CSI-RS resource through the TCI status, and the QCL type is configured as typeD, then the terminal can receive the target downlink signal by using the same spatial reception parameter (that is, Spatial Rx parameter) as receiving the reference SSB or reference CSI-RS resource. Usually, the target downlink channel (or downlink signal) and its reference SSB or reference CSI-RS resource are sent by the same TRP or the same panel or the same beam on the network side. If the transmission TRP or transmission panel or transmission beam of two downlink signals or downlink channels are different, different TCI statuses are usually configured.

For the DL control channel, the TCI status of the corresponding CORESET can be indicated through RRC signaling or RRC signaling+MAC signaling.

However, as mentioned above, for multiple TRP transmissions, the NR Rel-16 protocol only supports the scheme that multiple TRPs simultaneously transmit data to the UE, that is, only supports the corresponding PDSCH multi-TRP enhanced scheme. Therefore, in Rel-17, the multi-TRP enhancement scheme of PDCCH will be studied. At present, 3GPP has related discussions, but there is still a lack of complete detailed solutions. This disclosure will provide a detailed implementation for specific details.

The technical solutions of the embodiments of the present application can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, LTE-based access to unlicensed spectrum, (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

Generally speaking, the number of connections supported by traditional communication systems is limited and easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

Optionally, the communication system in the embodiment of the present application can be applied to a carrier aggregation (CA) scenario, a dual connectivity (DC) scenario, or a standalone (SA) deployment scene.

Optionally, the communication system in the embodiment of the present application may be applied to an unlicensed spectrum, wherein the unlicensed spectrum may also be considered as a shared spectrum; or, the communication system in the embodiment of the present application may also be applied to a licensed spectrum, wherein, the licensed spectrum can also be considered as non-shared spectrum.

The embodiments of the present application describe various embodiments in conjunction with network device and terminal device, wherein the terminal device may also be referred to as user equipment (UE), access terminal, user unit, user station, mobile station, mobile site, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, handheld devices with wireless communication functions, computing devices or other processing devices connected to wireless modems, vehicle-mounted devices, wearable devices, next-generation communication systems such as terminal devices in NR networks, or the terminal device in a future evolved public land mobile network (PLMN) network, etc.

In the embodiment of this application, the terminal device can be deployed on land, including indoor or outdoor, handheld, wearable or vehicle-mounted; the terminal device can also be deployed on water (such as ships, etc.); the terminal device can also be deployed in the air (such as aircraft, balloons and satellites).

In this embodiment of the application, the terminal device may be a mobile phone, a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network or the network device in the NTN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

As shown in FIG. 2, it is a system architecture diagram of a communication system applied in an embodiment of the present disclosure. The communication system may include a network device, and the network device may be a device that communicates with a terminal device (or referred to as a communication terminal, terminal). The network device can provide communication coverage for a specific geographic area, and can communicate with terminal devices located within the coverage area. FIG. 2 exemplarily shows one network device and two terminal devices. Optionally, the communication system may include multiple network devices and each network device may include other numbers of terminal devices within the coverage area, which is not limited in this embodiment of the present application. Optionally, the communication system may further include other network entities such as a network controller and a mobility management entity, which is not limited in this embodiment of the present application.

In the embodiment, the network device may further include an access network device and a core network device. That is, the wireless communication system also includes multiple core networks for communicating with access network devices. The access network device may be a long-term evolution (LTE) system, a next-generation (mobile communication system) (next radio, NR) system, or evolved base station (evolutional node B, referred to as eNB or e-NodeB) in an authorized auxiliary access long-term evolution (LAA-LTE) system, a macro base station, a micro base station (also called a "small base station"), a pico base station, an access point (access point, AP), a transmission point (TP) or a new generation base station (new generation Node B, gNodeB), etc.

It should be understood that a device with a communication function in the network/system in the embodiment of the present application may be referred to as a communication device. Taking the communication system shown in FIG. 2 as an example, the communication device may include a network device and a terminal device with communication functions. The network device and terminal device may be the specific devices described in the embodiments of the present disclosure, which will not be described in detail here; the communication device may also include other devices in the communication system, such as a network controller, a mobility management entity and other network entities, which are not limited in the embodiments of the present application.

Hereinafter, the technical solution of the present application will be further described in the form of embodiments.

As shown in FIG. 3, it is a schematic diagram of an embodiment of a method for PDCCH configuration in the embodiment of the present application, which may include:

301. A first terminal device receives first configuration information sent by a first device, wherein the first configuration information indicates N first search spaces, corresponding physical downlink control channel PDCCH (or PDCCH candidate) in the N first search spaces are associated with each other, and/or, the N first search spaces are associated with each other, and the N first search spaces correspond to the PDCCH.

In the embodiment, N is an integer greater than or equal to 2, which can also be written as N≥2.

1. Description of the First Device:

Optionally, the first device may be a network device. That is, it corresponds to a situation where the network device communicates with the first terminal device. The first configuration information may be used for information transmission between the first terminal device and the network device, or for information transmission between the first terminal device and other terminal devices.

Optionally, the first device is a second terminal device. The first configuration information may be determined by the second terminal device, or the second terminal device may receive the configuration information sent from the network device and then send it to the first terminal device. That is, it supports terminal-to-terminal communication, such as device-to-device (D2D), vehicle wireless communication technology (vehicle to X, V2X), sidelink communication, etc.

Optionally, the value of N is 2. Compared with N being greater than 2, the implementation of the scheme is relatively simple and the complexity is low, and most of the gains of the multi-TRP transmission scheme can be obtained.

It can be understood that, if the N first search spaces are referred to as one group, then the first configuration information may configure multiple groups. For example, J groups, each group contains multiple first search spaces, and the PDCCH candidates corresponding to the multiple first search spaces in each group are associated with each other. The number of first search spaces contained in each group may be the same or different. The following descriptions are all based on one of the groups.

2. Description of the First Configuration Information:

Optionally, each first search space corresponds to a first CORESET.

a. Optionally, the N first search spaces correspond to the same first CORESET. It can save CORESET configuration. Compared with b, there is no need to configure N CORESETs, but only one.

b. Optionally, the N first search spaces correspond to M different first CORESETs, where M≤N. Different CORESETs can come from different TRPs, which makes network implementation relatively simple. It should be noted that the following schemes starting from c are all based on b (not compatible with a).

Optionally, M=N is the preferred solution. Compared with the scheme in which M is greater than N, M=N is a one-to-one scheme in which N first search spaces correspond to M different first CORESETs, and the implementation method is the simplest.

c. Optionally, the active transmission configuration indication states (TCI-States) corresponding to the M first CORESETs are configured with the same quasi-co-location QCL type. For example: the active TCI-States corresponding to the M first CORESETs are all configured with QCL-TypeA, or are all configured with QCL-TypeA and QCL-TypeD, or are all configured with QCL-TypeD.

d. Optionally, the M first CORESETs correspond to the same number of symbols, that is, occupy the same number of orthogonal frequency division multiplexing (OFDM) symbols. The number of symbols corresponding to different CORESETs is the same, and the terminal device can use the same time-domain filter structure to achieve reception, thereby reducing the implementation complexity of the terminal device. Otherwise, the terminal equipment needs to use different time-domain filters to receive different CORE-SETs.

Optionally, the RRC parameter duration (duration) takes the same value. It should be noted that the duration in the CORESET and the duration in the search space are two different parameters.

e. Optionally, the M first CORESETs correspond to the same number of physical resource blocks (PRBs), that is, occupy the same number of PRBs. Different CORESETs correspond to the same number of PRBs, and the terminal device can use a similar frequency domain filter structure to achieve reception, thereby reducing the implementation complexity of the terminal device.

Optionally, the number of bits (bits) whose value is 1 in the RRC parameter frequency domain resources (frequencyDomainResources) is the same.

f. Optionally, PRB positions corresponding to two first CORESETs among the M first CORESETs are different from each other by an offset. For example: one first CORE-SET occupies PRB n, n+1, and another first CORESET occupies PRB n+K, n+1+K. The number of PRBs corresponding to different CORESETs is the same, and the terminal device can use the same frequency domain filter structure to achieve reception, thereby reducing the implementation complexity of the terminal device.

g. Optionally, the interleaving types corresponding to the M first CORESETs are the same, or the parameters of interleaved parts corresponding to the M first CORESETs are the same. Using the same interleaving type, the terminal device can use a similar deinterleaver to receive the PDCCH, thereby reducing the implementation complexity of the terminal device.

i. Optionally, none of the M first CORESETs uses interleaving. Without interleaving, the terminal device can use the same receiver to receive the PDCCH, thereby reducing the implementation complexity of the terminal device.

Optionally, the M first CORESETs are all configured with RRC parameter non-interleave (nonInterleaved).

ii. Optionally, the RRC parameters interleave (interleaved) corresponding to the M first CORESETs are configured with the same value. Different first CORESETs use the same interleaving type, and the terminal device can use the same deinterleaver to receive the PDCCH, thereby reducing the implementation complexity of the terminal device.

iii. Optionally, resource element groups (resource-element group, REG) bundle sizes (BundleSize) corresponding to the M first CORESETs are the same. Different first CORESETs use the same REG bundle size for interleaving, and the terminal device can use a similar deinterleaver to receive the PDCCH, thereby reducing the implementation complexity of the terminal device.

Optionally, the resource unit group bundle size (reg-BundleSize) corresponding to the M first CORESETs is configured with the same value.

iv. Optionally, the interleaver size values corresponding to the M first CORESETs are the same. Different first CORE-SETs use interleavers of the same size to perform interleaving, and the terminal device can use a similar deinterleaver to receive the PDCCH, thereby reducing the implementation complexity of the terminal device.

Optionally, the RRC parameter interleaver size (interleaverSize) configuration values corresponding to the M first CORESETs are the same.

v. Optionally, the interleaver offsets corresponding to the M first CORESETs are the same. Different first CORESETs use the same interleaver offset to perform interleaving, and the terminal device can use a similar deinterleaver to receive the PDCCH, thereby reducing the implementation complexity of the terminal device.

Optionally, the RRC parameter shift index (shiftIndex) configuration values corresponding to the M first CORE-SETs are the same.

h. Optionally, the precoding granularities corresponding to the M first CORESETs are the same. Different first CORESETs use the same precoding granularity, and the terminal device can use receivers with the same structure to receive the PDCCH, thereby reducing the implementation complexity of the terminal device.

Optionally, the RRC parameter precoding granularity (precoderGranularity) configuration values corresponding to the M first CORESETs are the same.

i. Optionally, the RRC parameter CORESET pool identifier, or the CORESET pool index (coresetPoolIndex) corresponding to the M first CORESETs are not configured. Avoiding the mixed use of multiple schemes can effectively reduce the complexity of signaling configuration and the implementation complexity of network devices and terminal devices.

It should be noted that the above schemes of c-i are realized on the basis of scheme b.

j. On the basis of anyone of the above (except i), optionally, the values corresponding to the RRC parameter coresetPoolIndex corresponding to the M first CORESETs are the same. The hybrid scheme can support the combined use of multiple schemes, thus providing greater freedom for network optimization. At the same time, the relevant parameters are restricted, so as to limit the degree of freedom to a certain extent, and achieve a good balance between the degree of freedom and complexity.

k. On the basis of anyone of the above (except i), optionally, the values corresponding to the RRC parameters coresetPoolIndex corresponding to the M first CORESETs are different. The hybrid scheme can support the combined use of multiple schemes, thus providing greater freedom for network optimization. Different coresetPoolIndex can correspond to different TRPs in actual network implementation.

3. Description of the number of bits in the TCI indication field in the DCI corresponding to the N first search spaces:

Optionally, the number of bits in the TCI indication field in the DCI corresponding to the N first search spaces are the same, that is, the number of bits of the indication filed of the "Transmission Configuration Indication (TCI)" are the same. The relevant fields of multiple associated DCIs are kept the same, so as to avoid wasting valid bits in a certain DCI.

a. The number of bits of the TCI indication field in the DCI corresponding to the N first search spaces is determined according to the TCI indication field corresponding to the first search space with the smallest or largest identifier (searchSpaceId) of the first search space.

The number of bits of the TCI indication field in the DCI corresponding to the N first search spaces is determined according the tci indication field corresponding to the first search space with the smallest or largest index in the first search space (the first search space with the smallest or largest identifier (searchSpaceId) in the first search space is recorded as the second search space). The first CORESET corresponding to different first search spaces can freely configure the information of the corresponding tci indication field, thereby maintaining the maximum degree of freedom in network configuration, at the cost of introducing new rules, for example, it is determined according to the second search space here.

i. Optionally, the number of bits of the TCI indication field in the DCI corresponding to the N first search spaces is determined according to the tci-PresentInDCI field in the RRC parameter of the first CORESET corresponding to the second search space, including the tci-PresentInDCI being configured as "enabled", or, the tci-PresentInDCI being not configured.

ii. Optionally, the number of bits of the TCI indication field in the DCI corresponding to the N first search spaces is determined according to the tci-PresentDCI-1-2 field in the RRC parameter of the first CORESET corresponding to the second search space, including the tci-PresentDCI-1-2 being configured as "enabled", or, the tci-PresentDCI-1-2 being not configured.

b. The number of bits of the TCI indication field in the DCI corresponding to the N first search spaces is determined according to the tci indication field corresponding to the first or last first search space (the first search space positioned first or last in the corresponding configuration or activation signaling of the first search space is recorded as the third search space). The first CORESET corresponding to different first search spaces can freely configure the information of the corresponding tci indication field, thereby maintaining the maximum degree of freedom in network configuration, at the cost of introducing new rules, for example, it is determined according to the third search space here.

i. Optionally, the number of bits of the TCI indication field in the DCI corresponding to the N first search spaces is determined according to the tci-PresentInDCI field in the RRC parameter of the first CORESET corresponding to the third search space, including the tci-PresentInDCI being configured as "enabled", or the tci-PresentInDCI being not configured.

ii. Optionally, the number of bits of the TCI indication field in the DCI corresponding to the N first search spaces is determined according to the tci-PresentDCI-1-2 field in the RRC parameter of the first CORESET corresponding to the third search space, including the tci-PresentDCI-1-2 being configured as "enabled", or the tci-PresentDCI-1-2 being not configured.

c. Optionally, the tci-PresentInDCI in the RRC parameters corresponding to the M first CORESETs are configured with the same value, or none is configured. It is realized through the configuration of the existing RRC parameters, and no additional rule is needed to be introduced for indication, thereby reducing the implementation complexity of the entire solution.

d. Optionally, the tci-PresentDCI-1-2 in the RRC parameters corresponding to the M first CORESETs are configured with the same value, or none is configured. It is realized through the configuration of the existing RRC parameters, and no additional rule is needed to be introduced for indication, thereby reducing the implementation complexity of the entire solution.

e. The number of bits of the M first CORESETs corresponding to the TCI indication field in the DCI is determined according to the RRC parameter configuration in the first CORESET with the smallest or largest identifier (control-ResourceSetId) in the first CORESET (the first CORESET with the smallest or largest identifier in the first CORESET is denoted as the second CORESET). Different CORESETs can be configured with different bits of the tci indication field, so that it is not the associated Search The DCI corresponding to the space can have more degrees of freedom, avoiding all Searches corresponding to these CORE-SETs space, (including unassociated search space) all use the same number of bits in the tci indication field, so as to maintain the maximum flexibility of network configuration.

i. Optionally, the number of bits of the TCI indication field in the DCI corresponding to the M first CORESETs is determined according to the tci-PresentInDCI field in the RRC parameter of the second CORESET, including the tci-PresentInDCI being configured as "enabled", or, the tci-PresentInDCI being not configured.

ii. Optionally, the number of bits of the TCI indication field in the DCI corresponding to the M CORESETs is determined according to the tci-PresentDCI-1-2 field in the RRC parameter of the second CORESET, including the tci-PresentDCI-1-2 being configured as "enabled", or, the tci-PresentDCI-1-2 being not configured.

4. Description regarding the number of times of the PDCCH occasions in the same time slot corresponding to the N first search spaces:

Optionally, the number of times of the PDCCH occasions (the PDCCH occasion may also be referred to as PDCCH monitoring opportunity (PDCCH monitoring occasion)) in the same time slot corresponding to the N first search spaces are the same. The network configuration complexity can be reduced, and the terminal device implementation complexity can be reduced at the same time.

5. Description regarding the corresponding values in the configuration values in the monitoring symbols in slots of the RRC parameter corresponding to the N first search spaces:

Optionally, the number of bits corresponding to a value of 1 among configuration values of the RRC parameter monitoring symbols within slot (monitoringSymbolsWithinSlot) corresponding to the N first search spaces is the same. Restricting the related configuration of the associated search space can reduce the complexity of the network configuration and at the same time reduce the implementation complexity of the terminal device.

Optionally, the bit positions corresponding to a value of 1 among the configuration values of the RRC parameter monitoringSymbolsWithinSlot corresponding to the N first search spaces are interleaved, for example, appear alternately. For example: considering the situation of two first search spaces, one first search space correspondingly configures "1" at positions #1 and #8, and the other first search space correspondingly configures "1" at positions #4 and #11, this configuration meets this requirement. If one first search space is configured with "1" at positions #1 and #4, and another first search space is configured with "1" at positions #8 and #11, this configuration does not meet this requirement. For example, a certain first search space needs to monitor PDCCH on both two discontinuous symbols of a slot, and then the other N−1 associated first search spaces need to monitor PDCCH on at least one symbol between these two symbols. Restricting the related configuration of the associated search space can reduce the complexity of the network configuration and at the same time reduce the implementation complexity of the terminal device.

6. Description of the span corresponding to one PDCCH monitoring occasion in one slot of the N first search spaces:

Optionally, the span (the number of consecutive symbols, reference can be made to the R16 versions of protocols TS 38.213, TS 38.331, TS 38.306) corresponding to one PDCCH monitoring occasion in one slot of the N first search spaces is the same. In the embodiment, corresponding configuration of the PDCCH monitoring occasions corresponding to associated search spaces are restricted, which can reduce the complexity of network configuration and reduce the complexity of terminal device implementation.

7. Description for indicating the N first search spaces by the second device through RRC signaling:

Optionally, the second device indicates that the N first search spaces are associated through RRC signaling.

a. Optionally, the RRC parameters corresponding to the N first search spaces are configured with the same group identifier (group id). By configuring the corresponding group id, a relatively small RRC signaling overhead can be used to indicate the corresponding associated search space, reducing signaling overhead. See RRC Example 1 below.

i: Optionally, group id can take different values, the search spaces corresponding to the same group id value are associated. For example: the group id corresponding to the search space groups a, and b is x1, and the group id corresponding to the search spaces c and d is x2 (x1 is different from x2), the search spaces a and b are associated with each other, and the search spaces c and d are associated with each other.

ii: Optionally, the group id has the value of 0, 1, . . . , K. For example: K is 0, or 1, or 2, or 3, or 4.

iii: Optionally, the group id has the value of 1, . . . , K. For example: K is 1, or 2, or 3, or 4, or 5.

b. Optionally, at least one first search space in the N first search spaces indicates other associated first search spaces. Advantages: only part of the first search spaces among the N associated first search spaces need to be configured, so that relatively small RRC signaling overhead can be used to indicate the corresponding associated search space, reducing signaling overhead. See RRC Example 2 below.

c. Optionally, the second device configures multiple search space lists (search space list), the search spaces at corresponding positions of different search space lists are associated. It avoids modifying existing search space configuring message, utilizes the existing signaling design to the greatest extent, so that the workload of signaling design can be reduced. See RRC Example 3 below. The solutions corresponding to the above three examples are parallel, that is, they belong to different options.

For example: list 1 contains 3 searches space, list 2 contains 1 search space, the first one search space in list 1 and the one search space in list 2 are associated; for another example: list 1 contains 3 search spaces, list 2 contains 2 search spaces, the first one search space in list 1 and the first one search space in list 2 are associated, the second one search space in list 1 and the second one search space in list 2 are associated.

8. Description of the second device through MAC CE signaling indicates the description of the N first search spaces:

Optionally, the second device uses the media access control control unit MAC CE signaling to indicate that the N first search spaces are associated.

a. Optionally, the MAC CE indicates N first search spaces, and the N search spaces are associated. Each MAC CE indicates a set of associated search spaces, and the signaling is simple to implement.

b. Optionally, the MAC CE indicates K first search spaces, wherein every N adjacent first search spaces are associated. Example: MAC CE indicates 4 first search spaces, assuming N=2, wherein the first is associated with the second first search space; the third first search space is associated with the fourth first search space; one MAC CE can indicate multiple sets of associated search spaces, which can save signaling overhead and improve system efficiency.

c. Optionally, the MAC CE indicates K first search spaces and indicates corresponding groups, and the first search spaces belonging to the same group are associated. The group is not necessarily explicitly visible, but can be represented by an identifier or index (not the searchSpaceId, but another new identifier or index). one MAC CE can indicate multiple sets of associated search spaces, which can save signaling overhead and improve system efficiency.

Optionally, N may be a preset default value or a value configured by the network device.

Optionally, the K first search spaces are indicated by indicating identifiers corresponding to the first search spaces. When the number of search spaces indicated by the MAC CE is small, the number of bits of the MAC signaling can be saved.

Optionally, the K first search spaces are indicated by a bitmap. When the number of search spaces indicated by the MAC CE is large, the number of bits of the MAC signaling can be saved.

Figure 4A:
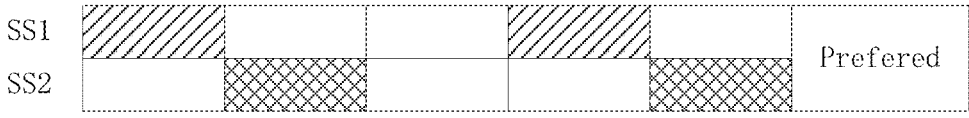
FIG. 4A is a schematic diagram where the slots of the PDCCHs occasion corresponding to the N first search space are interleaved in the embodiment of the present application.
Figure 4B:
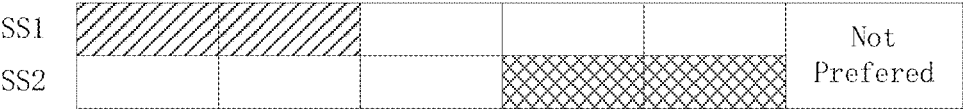
FIG. 4B is a schematic diagram where the slots of the PDCCHs occasion corresponding to the N first search space are not interleaved in the embodiment of the present application.
Figure 4C:
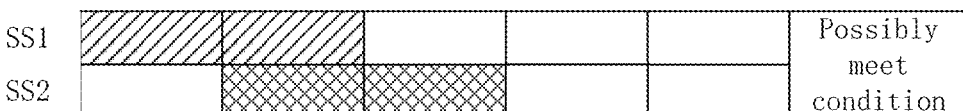
FIG. 4C is a schematic diagram where the slots of the PDCCHs occasion corresponding to the N first search space are possibly interleaved in the embodiment of the present application.

9. Description on the periods and time offsets corresponding to the N first search spaces:

Optionally, the periods corresponding to the N first search spaces are the same, and the time offsets are different.

a. Optionally, the time slots (slot) caused by the time offsets of the N first search spaces are adjacent, or no downlink slot is positioned between the corresponding slots caused by the time offsets of the N first search spaces, or no flexible slot is positioned between the corresponding slots caused by the time offsets of the N first search spaces. Now the associated PDDCHs are on the adjacent downlink slot, which can reduce the PDCCH reception delay.

b. Optionally, the respective nth PDCCH occasions of the N first search spaces in the same cycle are associated with each other. Restricting fixed associations can reduce the complexity of network configuration and the complexity of terminal implementation.

c. Optionally, the PDCCH occasion of the first search space X at slot n is associated with a PDCCH occasion of the first search space Y at slot n', wherein the slot n' is a first one slot after the slot n that has the PDCCH occasion corresponding to the first search space Y. Restricting fixed associations can reduce the complexity of network configuration and the complexity of terminal implementation.

i. Optionally, the identity (searchSpaceId) of the first search space X is smaller than the identity (searchSpaceId) of the first search space Y.

ii. Optionally, the identity (searchSpaceId) of the first search space X is greater than the identity (searchSpaceId) of the first search space Y.

iii. Optionally, the identity (controlResourceSetId) of the CORESET corresponding to the first search space X is smaller than the identity (controlResourceSetId) of the CORESET corresponding to the first search space Y.

iv. Optionally, the identity (controlResourceSetId) of the CORESET corresponding to the first search space X is greater than the identity (controlResourceSetId) of the CORESET corresponding to the first search space Y.

v. Optionally, the time-domain offset value corresponding to the first search space X is smaller than the time-domain offset value corresponding to the first search space Y.

vi. Optionally, the time-domain offset value corresponding to the first search space X is larger than the time-domain offset value corresponding to the first search space Y.

vii. Optionally, each of the N first search spaces has only one PDCCH occasion in one slot. The relevant configuration of the associated search space is restricted to reduce the complexity of buffering by the terminal, thereby reducing the implementation complexity of the terminal.

viii. Optionally, the configuration value of RRC parameter monitoringSymbolsWithinSlot corresponding to each first search space in the N first search spaces has only one bit with value 1 (the monitoringSymbolsWithinSlot is a bitmap structure (BIT STRING (SIZE (14)), including 14 symbols, and when a bit at a certain position is configured as 1, then the symbol at the corresponding position in a slot is the starting symbol of the PDCCH occasion). The relevant configuration of the associated search space is restricted, and the complexity of buffering by the terminal device is reduced, thereby reducing the implementation complexity of the terminal device.

d. Optionally, the slots having the PDCCH occasions corresponding to the N first search spaces are interleaved. For example, take N=2 first search spaces (denoted as SS1 and SS2 respectively) being associated as an example. FIG. 4A meets this condition, and FIG. 4B does not meet this condition, and FIG. 4C may possibly meet this condition. The relevant configuration of the associated search space is restricted, and the complexity of buffering by the terminal device is reduced, thereby reducing the implementation complexity of the terminal device.

e. Optionally, PDCCH occasion X corresponding to the first search space X is associated with the PDCCH occasion Y of the first search space Y, wherein no other PDCCH occasion corresponding to the two first search space of the first search space X and the first search space Y is positioned between the PDCCH occasion X and the PDCCH occasion Y. Taking N=2 as an example, the related configuration of the associated search space can be restricted to reduce the complexity of buffering by the terminal device, thereby reducing the implementation complexity of the terminal device.

f. Optionally, the PDCCH occasion X corresponding to the first search space X is associated with the PDCCH occasion Y of the first search space Y, no one or more first slot is positioned between the PDCCH occasion X and the PDCCH occasion Y, wherein the one or more first slots includes the PDCCH occasion corresponding to the two first search space of the first search space X and the first search space Y. Taking N=2 as an example, the relevant configuration of the associated search space can be restricted to reduce the complexity of buffering by the terminal device, thereby reducing the implementation complexity of the terminal device.

g. Optionally, the value of RRC parameter duration (duration) corresponding to the N first search spaces is 1. The relevant configuration of the associated search space is restricted, and the complexity of buffering by the terminal device is reduced, thereby reducing the implementation complexity of the terminal device.

10. Description on the periods and time offsets corresponding to the N first search spaces:

Optionally, the periods and time offsets corresponding to the N first search spaces are the same, for example intra-slot PDCCH repetition, that is, the transmission of one DCI from multiple TRPs is in the same slot. The advantage is that the associated search space period and time offset are the same, which can reduce the complexity of network configuration and the complexity of terminal implementation.

a. Optionally, the RRC parameters of the period and offset for monitoring the slot (monitoring Slots PeriodicityAnd Offset) corresponding to the N first search spaces are configured with the same value.

b. Optionally, the maximum number of bits corresponding to a value of 1 among the configuration values in the RRC parameter monitoringSymbolsWithinSlot corresponding to each of the N first search spaces is 1. Restricting the related configuration of the associated search space can reduce the complexity of the network configuration and at the same time reduce the complexity of the terminal implementation.

c. Optionally, the maximum number of bits corresponding to a value of 1 among the configuration values in the RRC parameter monitoringSymbolsWithinSlot corresponding to each of the N first search spaces is 2. Restricting the related configuration of the associated search space can reduce the complexity of the network configuration and at the same time reduce the complexity of the terminal implementation.

11. Description of the number of consecutive slots that appear in the N first search spaces within one cycle:

Optionally, the number of consecutive slots appearing in the N first search spaces within one period is the same. The associated search space appears in the same number of slots, which can reduce the complexity of network configuration and reduce the complexity of terminal implementation.

Optionally, the RRC parameter duration corresponding to the N first search spaces is configured with the same value, or the RRC parameter duration corresponding to the N first search spaces is not configured.

12. Description of the DCI formats corresponding to the N first search spaces:

Optionally, the DCI formats (DCI format) corresponding to the N first search spaces are the same. The complexity of network configuration can be reduced, and the complexity of terminal implementation can be reduced at the same time.

13. Description of the aggregation level in the N first search spaces:

Optionally, the DCCH candidates with a same aggregation level L and having a same index are associated with each other (for example, DCCH candidate with the aggregation level L and having the index m in the first search space A is associated with the DCCH candidate with the aggregation level L and having the index m in the first search space B). The advantage is to associate the PDCCH candidates through a fixed rule, which can reduce signaling overhead and reduce network and terminal implementation complexity.

a. Optionally, the associated PDCCHs in the N first search spaces indicate the same information.

b. Optionally, the associated PDCCHs in the N first search spaces indicate the same physical downlink shared channel (PDSCH) scheduling.

i. Optionally, the UE is not expected to receive a PDSCH with mapping type A in a slot, if the first PDCCH scheduling the PDSCH was received in the same slot and was not contained within the first three symbols of the slot, wherein the first PDCCH is the PDCCH with the latest end position among the associated PDCCHs corresponding to the N first search spaces. Related scheduling is restricted to reduce the complexity of terminal implementation.

ii. Optionally, if the end symbol of the first PDCCH is later than the start symbol of the PDSCH scheduled by the first PDCCH, the first terminal device does not expect the PDSCH to use mapping type A (mapping type A) (or in other words: the UE is not expected to receive a PDSCH with mapping type B in a slot, if the first symbol of the first PDCCH scheduling the PDSCH was received in a later symbol than the first symbol indicated in the PDSCH time domain resource allocation), wherein the first PDCCH is the PDCCH with the latest end position among the associated PDCCHs corresponding to the N first search spaces. Related scheduling is restricted to reduce the complexity of terminal implementation.

c. Optionally, the associated PDCCHs in the N first search spaces indicate the same physical uplink shared channel (PUSCH) scheduling.

d. Optionally, the associated PDCCHs in the N first search spaces indicate the same channel state information (CSI) report.

e. Optionally, the associated PDCCHs in the N first search spaces indicate the same channel sounding reference signal (SRS) transmission.

f. Optionally, the associated PDCCHs in the N first search spaces indicate the same physical random access channel (PRACH) transmission.

14. Optionally, all or part of the N first search spaces are used to transmit the same DCI.

It can be understood that the same DCI can be understood as at least one of the following: indicating the same information, indicating the same PDSCH scheduling, indicating the same PUSCH scheduling, indicating the same CSI reporting, indicating the same SRS scheduling, indicating the same PDSCH scheduling, indicating the same PRACH scheduling.

Optionally, the time-frequency resources when the same DCI is transmitted in different first search spaces do not completely overlap each other, for example, the time-domain resources when the same DCI is transmitted in two different first search spaces may not overlap at all, or the frequency domain resources do not overlap at all, or the time-frequency resources only partially overlap.

Bits obtained after channel coding of one piece of DCI information are transmitted from some or all of the first search spaces in the N first search spaces, or after one piece of DCI information is channel coded, different redundancy versions are transmitted from part or all of the first search spaces in the N first search spaces. The transmission reliability of the control channel is improved by repeatedly transmitting the same information from multiple first search spaces.

Optionally, the PDCCHs transmitted in the N first search spaces.

It should be noted that, unless otherwise specified, the above-mentioned different implementation manners can be combined with each other to form a new solution, which is also within the protection scope of the present application, and will not be repeated here.

302. The first terminal device receives a corresponding PDCCH according to the first configuration information.

Optionally, the PDCCH occasions corresponding to the N first search spaces are associated in the following way (take N=2 as an example), the first search space has a PDCCH occasion x in slot $$n_{s,f,0}^{\mu},$$

and the second first search space has a PDCCH occasion Y in slot $$n_{s,f,1}^{\mu},$$

the PDCCH occasion X and PDCCH occasion Y are associated, wherein the following conditions are met:

$$(n_f \cdot N_{slot}^{frame,\mu} + n_{s,f,0}^{\mu} - O_{s,0}) \bmod k_{s,0} = 0$$

$$(n_f \cdot N_{slot}^{frame,\mu} + n_{s,f,1}^{\mu} - O_{s,1}) \bmod k_{s,1} = 0$$

and the value of abs $$(n_{s,f,0}^{\mu} - n_{s,f,1}^{\mu})$$

is the smallest;

the $k_{s,0}$, the $O_{s,0}$ are the cycle and time domain offset of the first one first search space, the $k_{s,1}$ and the $O_{s,1}$ are the cycle and time domain offset of the second one first search space, the $$N_{slot}^{frame,\mu}$$

indicates the number of slots in a frame, the $n_f$ is the index of the frame, the $$n_{s,f,0}^{\mu}$$

and the $$n_{s,f,1}^{\mu}$$

represent the index of the slot in the frame, the $\mu$ indicates the corresponding numerology.

Optionally, $O_{s,0} < O_{s,1}$.

In the technical solution provided by the embodiment of the present disclosure, the first terminal device receives the first configuration information sent by the first device, the first configuration information indicates N first search spaces, and the physical downlink control channels PDCCHs corresponding to the N first search spaces are associated with each other, and/or, the N first search spaces are associated with each other, and N is an integer greater than or equal to 2. It is used to realize multi-TRP enhancement of PDCCH.

(1) RRC Embodiment 1

Based on the existing RRC parameters, corresponding modifications are made, and the modified parts are marked in bold. In the example, the newly added filed name is only for example, and other names can be used. In addition, the position of the newly added field is only for example and can be changed. The same will not be repeated for the following examples. In addition, in general examples, the association of two search spaces is taken as an example, and the association of more search spaces can be similarly obtained.

Example 1-1: Adding a New Field to SearchSpace

```
SearchSpace ::=                        SEQUENCE {
    searchSpaceId                      SearchSpaceId
    controlResourceSetId                               ControlResourceSetId
OPTIONAL,   -- Cond SetupOnly
    monitoringSlotPeriodicityAndOffset    CHOICE {
        sl1                                NULL,
        sl2                                INTEGER (0..1)
        sl4                                INTEGER (0..3)
        sl5                                INTEGER (0..4)
        sl8                                INTEGER (0..7)
        sl10                               INTEGER (0..9)
        sl16                               INTEGER (0..15)
        sl20                               INTEGER (0..19)
        sl40                               INTEGER (0..39)
        sl80                               INTEGER (0..79)
        sl160                              INTEGER (0..159)
        sl320                              INTEGER (0..319)
        sl640                              INTEGER (0..639)
        sl1280                             INTEGER (0..1279)
        sl2590                             INTEGER (0..2559)
    }
OPTIONAL,   -- Cond Setup
    duration                                        INTEGER (2..2559)
OPTIONAL,   -- Need R
    monitoringSymbolsWithinSlot                 BIT STRING (SIZE (14))
OPTIONAL,   -- Cond Setup
    nrofCandidates                     SEQUENCE {
        aggregationLevel1                  ENUMERATED {n0, n1, n2, n3, n4,
n5, n6, n8},
        aggregationLevel2                  ENUMERATED {n0, n1, n2, n3, n4,
n5, n6, n8},
        aggregationLevel4                  ENUMERATED {n0, n1, n2, n3, n4,
n5, n6, n8},
        aggregationLevel8                  ENUMERATED {n0, n1, n2, n3, n4,
n5, n6, n8},
        aggregationLevel16                 ENUMERATED {n0, n1, n2, n3, n4,
n5, n6, n8}
    }
OPTIONAL,   -- Cond Setup
    searchSpaceType                    CHOICE {
        common                             SEQUENCE {
            dci-Format0-0-AndFormat1-0         SEQUENCE {
            ...
        }
OPTIONAL,   -- Need R
            dci-Format2-0                      SEQUENCE {
                nrofCandidates-SFI                 SEQUENCE {
                    aggregationLevel1                  ENUMERATED {n1, n2}
OPTIONAL,   -- Need R
                    aggregationLevel2                  ENUMERATED {n1, n2}
OPTIONAL,   -- Need R
                    aggregationLevel4                  ENUMERATED {n1, n2}
OPTIONAL,   -- Need R
                    aggregationLevel8                  ENUMERATED {n1, n2}
OPTIONAL,   -- Need R
                    aggregationLevel16                 ENUMERATED {n1, n2}
OPTIONAL    -- Need R
                },
            ...
            }
OPTIONAL,   -- Need R
            dci-Format2-1                      SEQUENCE {
            ...
            }
OPTIONAL,   -- Need R
            dci-Format2-2                      SEQUENCE {
            ...
            }
OPTIONAL,   -- Need R
            dci-Format2-3                      SEQUENCE {
                dummy1                             ENUMERATED {sl1, sl2, sl4,
sl5, sl8, sl10, sl16, sl20} OPTIONAL,   -- Cond Setup
                dummy2                             ENUMERATED {n1, n2},
            ...
            }
OPTIONAL    -- Need R
        },
        ue-Specific                        SEQUENCE {
```

-continued

```
        dci-Formats                          ENUMERATED {formats0-0-
And-1-0, formats0-1-And-1-1},
        ...,
        [[
        dci-Formats-MT-r16                   ENUMERATED {formats2-5}
OPTIONAL,      -- Need R
        dci-FormatsSL-r16                    ENUMERATED {formats0-0-And-1-0,
formats0-1-And-1-1, formats3-0, formats3-1,
                                                 formats3-0-And-3-1}
OPTIONAL,      -- Need R
        dci-FormatsExt-r16                   ENUMERATED {formats0-2-And-1-2,
formats0-1-And-1-1And-0-2-And-1-2}
OPTIONAL       -- Need R
        ]]
      }
  }
OPTIONAL     -- Cond Setup2
  GroupID                        type      OPTIONAL
  }
```

An optional field is newly added, marked by GroupID, whose value is an integer (starting from 0, or starting from 1). If the values corresponding to the GroupID in two search spaces, then the two search spaces are associated with each other.

Example 1-2: Adding a New Field in SearchSpaceExt

```
SearchSpaceExt-r16 ::=        SEQUENCE {
    controlResourceSetId-r16                  ControlResourceSetId-r16
OPTIONAL,    -- Cond SetupOnly2
    searchSpaceType-r16              SEQUENCE {
       common-r16                    SEQUENCE {
          dci-Format2-4-r16             SEQUENCE {
             nrofCandidates-CI-r16         SEQUENCE {
                aggregationLevel1-r16           ENUMERATED {n1, n2}
OPTIONAL,    -- Need R
                aggregationLevel2-r16           ENUMERATED {n1, n2}
OPTIONAL,    -- Need R
                aggregationLevel4-r16           ENUMERATED {n1, n2}
OPTIONAL,    -- Need R
                aggregationLevel8-r16           ENUMERATED {n1, n2}
OPTIONAL,    -- Need R
                aggregationLevel16-r16          ENUMERATED {n1, n2}
OPTIONAL    -- Need R
             },
             ...
          }
OPTIONAL,    -- Need R
          dci-Format2-5-r16            SEQUENCE {
             nrofCandidates-IAB-r16        SEQUENCE {
                aggregationLevel1-r16           ENUMERATED {n1, n2}
OPTIONAL,    -- Need R
                aggregationLevel2-r16           ENUMERATED {n1, n2}
OPTIONAL,    -- Need R
                aggregationLevel4-r16           ENUMERATED {n1, n2}
OPTIONAL,    -- Need R
                aggregationLevel8-r16           ENUMERATED {n1, n2}
OPTIONAL,    -- Need R
                aggregationLevel16-r16          ENUMERATED {n1, n2}
OPTIONAL    -- Need R
             },
             ...
          }
OPTIONAL,    -- Need R
          dci-Format2-6-r16            SEQUENCE {
             ...
          }
OPTIONAL,    -- Need R
          ...
       }
    }
OPTIONAL,      -- Cond Setup3
```

-continued

| searchSpaceGroupIdList-r16 | SEQUENCE (SIZE (1.. 2)) OF |
| INTEGER (0..1)      OPTIONAL,   -- Need R | |
| freqMonitorLocations-r16 | BIT STRING (SIZE (5)) |
| OPTIONAL      -- Need R | |
| GroupID | type | OPTIONAL |
| } | |

An optional field is newly added, marked by GroupID, [10] whose value is an integer (starting from 0, or starting from 1). If the values corresponding to the GroupID in two search spaces, then the two search spaces are associated with each other.

(2) RRC Embodiment 2

Example 2-1: Adding a New Field to SearchSpace

```
SearchSpace ::=                        SEQUENCE {
    searchSpaceId                      SearchSpaceId
    controlResourceSetId                           ControlResourceSetId
OPTIONAL,  -- Cond SetupOnly
    monitoringSlotPeriodicityAndOffset    CHOICE {
        sl1                                NULL,
        sl2                                INTEGER (0..1)
        sl4                                INTEGER (0..3)
        sl5                                INTEGER (0..4)
        sl8                                INTEGER (0..7)
        sl10                               INTEGER (0..9)
        sl16                               INTEGER (0..15)
        sl20                               INTEGER (0..19)
        sl40                               INTEGER (0..39)
        sl80                               INTEGER (0..79)
        sl160                              INTEGER (0..159)
        sl320                              INTEGER (0..319)
        sl640                              INTEGER (0..639)
        sl1280                             INTEGER (0..1279)
        sl2590                             INTEGER (0..2559)
    }
OPTIONAL,  -- Cond Setup
    duration                                       INTEGER (2..2559)
OPTIONAL,  -- Need R
    monitoringSymbolsWithinSlot                    BIT STRING (SIZE (14))
OPTIONAL,  -- Cond Setup
    nrofCandidates                     SEQUENCE {
        aggregationLevel1                  ENUMERATED {n0, n1, n2, n3, n4,
n5, n6, n8},
        aggregationLevel2                  ENUMERATED {n0, n1, n2, n3, n4,
n5, n6, n8},
        aggregationLevel4                  ENUMERATED {n0, n1, n2, n3, n4,
n5, n6, n8},
        aggregationLevel8                  ENUMERATED {n0, n1, n2, n3, n4,
n5, n6, n8},
        aggregationLevel16                 ENUMERATED {n0, n1, n2, n3, n4,
n5, n6, n8}
    }
OPTIONAL,  -- Cond Setup
    searchSpaceType                    CHOICE {
        common                             SEQUENCE {
            dci-Format0-0-AndFormat1-0         SEQUENCE {
                ...
        }
OPTIONAL,  -- Need R
        dci-Format2-0                      SEQUENCE {
            nrofCandidates-SFI                 SEQUENCE {
                aggregationLevel1                      ENUMERATED {n1, n2}
OPTIONAL,  -- Need R
                aggregationLevel2                      ENUMERATED {n1, n2}
OPTIONAL,  -- Need R
                aggregationLevel4                      ENUMERATED {n1, n2}
OPTIONAL,  -- Need R
                aggregationLevel8                      ENUMERATED {n1, n2}
OPTIONAL,  -- Need R
```

-continued

```
        aggregationLevel16                           ENUMERATED {n1, n2}
OPTIONAL    -- Need R
        },
        ...
        }
OPTIONAL,   -- Need R
        dci-Format2-1                        SEQUENCE {

...
        }
OPTIONAL,   -- Need R
        dci-Format2-2                        SEQUENCE {

...
        }
OPTIONAL,   -- Need R
        dci-Format2-3                        SEQUENCE {
            dummy1                           ENUMERATED {sl1, sl2, sl4,
sl5, sl8, sl10, sl16, sl20} OPTIONAL,   -- Cond Setup
            dummy2                           ENUMERATED {n1, n2}, ...
        }
OPTIONAL    -- Need R
        },
        ue-Specific                         SEQUENCE {
        dci-Formats                           ENUMERATED {formats0-0-
And-1-0, formats0-1-And-1-1},
        ...,
        [[
        dci-Formats-MT-r16                    ENUMERATED {formats2-5}
OPTIONAL,     -- Need R
        dci-FormatsSL-r16                  ENUMERATED {formats0-0-And-1-0,
formats0-1-And-1-1, formats3-0, formats3-1,
OPTIONAL,     -- Need R
        dci-FormatsExt-r16                 ENUMERATED {formats0-2-And-1-2,
formats0-1-And-1-1And-0-2-And-1-2}
OPTIONAL      -- Need R
        ]]
        }
    }
OPTIONAL    -- Cond Setup2
    linkSearchSpace                        type   OPTIONAL
}
```

An optional field is newly added, marked by linked-SearchSpace, the field indicates the search space (which can be one or more) associated with this search space. Optionally, its value can be the identity of one or more search spaces. For example, if the linkedSearchSpace of search space X corresponds to search space Y, or corresponds to the searchSpaceId of the search space Y, then the two search spaces X and Y are associated with each other.

Example 2-2: Adding a Newfield in SearchSpaceExt

```
SearchSpaceExt-r16 ::=                 SEQUENCE {
    controlResourceSetId-r16                   ControlResourceSetId-r16
OPTIONAL,       -- Cond SetupOnly2
    searchSpaceType-r16                 SEQUENCE {
        common-r16                      SEQUENCE {
            dci-Format2-4-r16               SEQUENCE {
                nrofCandidates-CI-r16           SEQUENCE {
                    aggregationLevel1-r16           ENUMERATED {n1, n2}
OPTIONAL,   -- Need R
                    aggregationLevel2-r16           ENUMERATED {n1, n2}
OPTIONAL,   -- Need R
                    aggregationLevel4-r16           ENUMERATED {n1, n2}
OPTIONAL,   - Need R
                    aggregationLevel8-r16           ENUMERATED {n1, n2}
OPTIONAL,   - Need R
                    aggregationLevel16-r16          ENUMERATED {n1, n2}
OPTIONAL    -- Need R
                },
                ...
            }
OPTIONAL,   -- Need R
            dci-Format2-5-r16               SEQUENCE {
                nrofCandidates-IAB-r16          SEQUENCE {
                    aggregationLevel1-r16           ENUMERATED {n1, n2}
```

-continued

```
OPTIONAL,     -- Need R
              aggregationLevel2-r16          ENUMERATED {n1, n2}
OPTIONAL,     -- Need R
              aggregationLevel4-r16          ENUMERATED {n1, n2}
OPTIONAL,     -- Need R
              aggregationLeve18-r16          ENUMERATED {n1, n2}
OPTIONAL,     -- Need R
              aggregationLevel16-r16         ENUMERATED {n1, n2}
OPTIONAL      -- Need R
        },
        ...
        }
OPTIONAL,     -- Need R
        dci-Format2-6-r16                    SEQUENCE {
        ...
        }
OPTIONAL,     -- Need R
        ...
        }
        }
OPTIONAL,     -- Cond Setup3
        searchSpaceGroupIdList-r16           SEQUENCE (SIZE (1.. 2)) OF
INTEGER (0..1)         OPTIONAL,   -- Need R
    freqMonitorLocations-r16                 BIT STRING (SIZE (5))
OPTIONAL      -- Need R
    linkSearchSpace                          type     OPTIONAL
}
```

An optional field is newly added, marked by linked-SearchSpace, the field indicates the search space (which can be one or more) associated with this search space. Optionally, its value can be the identity of one or more search spaces. For example, if the linkedSearchSpace of search space X corresponds to search space Y, or corresponds to the searchSpaceId of the search space Y, then the two search spaces X and Y are associated with each other.

(3) RRC Embodiment 3

Add anew field in SearchSpaceExt

```
PDCCH-Config ::=                             SEQUENCE {
        controlResourceSetToAddModList               SEQUENCE(SIZE (1..3)) OF
ControlResourceSet                           OPTIONAL,   -- Need N
        controlResourceSetToReleaseList              SEQUENCE(SIZE (1..3)) OF
ControlResourceSetId                         OPTIONAL,   -- Need N
        searchSpacesToAddModList                     SEQUENCE(SIZE (1..10)) OF SearchSpace
OPTIONAL,   -- Need N
        searchSpacesToReleaseList                    SEQUENCE(SIZE (1..10)) OF SearchSpaceId
OPTIONAL,   -- Need N
        downlinkPreemption                            SetupRelease { DownlinkPreemption }
OPTIONAL,   -- Need M
        tpc-PUSCH                                    SetupRelease { PUSCH-TPC-CommandConfig }
OPTIONAL,   -- Need M
        tpc-PUCCH                                    SetupRelease { PUCCH-TPC-CommandConfig }
OPTIONAL,   -- Need M
        tpc-SRS                                      SetupRelease { SRS-TPC-CommandConfig}
OPTIONAL,   -- Need M
        ...,
        [[
        controlResourceSetToAddModList2-r16          SEQUENCE (1..2)) OF
ControlResourceSet                           OPTIONAL,   -- Need N
        controlResourceSetToReleaseList-r16          SEQUENCE (SIZE (1..5)) OF
ControlResourceSetId-r16                     OPTIONAL,   -- Need N
        searchSpacesToAddModListExt-r16              SEQUENCE (SIZE (1..10)) OF SearchSpaceExt-
r16                                          OPTIONAL,   -- Need N
        uplinkCancellation-r16                        SetupRelease { UplinkCancellation-r16 }
OPTIONAL,   -- Need M
        monitoringCapabilityConfig-r16                             ENUMERATED
{ r15monitoringcapability,r16monitoringcapability }   OPTIONAL,   -- Need M
        searchSpaceSwitchConfig-r16                               SearchSpaceSwitchConfig-r16
OPTIONAL    -- Need R
        ]]
        searchSpacesListZ     type     OPTIONAL,   -- Need N
        }
```

An optional field is newly added, marked by searchSpaceListZ, the field indicates one or more search spaces.

The nth search space in searchSpacesToAddModList is associated with the nth search space in searchSpaceListZ.

The nth search space in searchSpacesToAddModListExt-r16 is associated with the nth search space in searchSpaceListZ.

Figure 5:
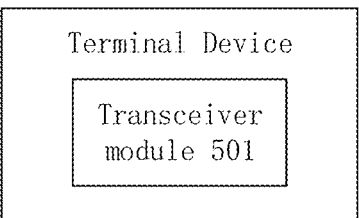
FIG. 5 is a schematic diagram of an embodiment of a terminal device in the embodiment of the present application.

As shown in FIG. 5, it is a schematic diagram of an embodiment of the terminal device in the embodiment of the present application, which may include:

a transceiver module 501, configured to receive first configuration information sent by a first device, wherein the first configuration information is configured to indicate N first search spaces, physical downlink control channels PDCCHs corresponding to the N first search spaces are associated with each other, and/or, the N first search spaces are associated with each other, and the N first search spaces correspond to the PDCCH, and wherein N is an integer greater than or equal to 2.

Optionally, each of the first search spaces corresponds to a control resource set CORESET.

Optionally, the N first search spaces correspond to M different first CORESETs, wherein M≤N.

Optionally, active transmission configuration indication states TCI-State corresponding to the M first CORESETs are configured with a same quasi-co-located QCL type.

Optionally, symbol numbers corresponding to the M first CORESETs are the same.

Optionally, PRB positions corresponding to two first CORESETs among the M first CORESETs are different from each other by an offset.

Optionally, PRB numbers corresponding to the M first CORESETs are the same.

Optionally, interleaving types corresponding to the M first CORESETs are the same, or parameters of interleaved parts corresponding to the M first CORESETs are the same.

Optionally, RRC parameters interleave (interleaved) corresponding to the M first CORESETs are configured with a same value.

Optionally, the M first CORESETs are interleaved.

Optionally, resource unit group bundle sizes corresponding to the M first CORESETs are the same.

Optionally, RRC parameters resource group bundle size (reg-BundleSize) corresponding to the M first CORESETs are configured with a same value.

Optionally, interleaver size values corresponding to the M first CORESETs are the same.

Optionally, RRC parameters interleaver size (interleaver-Size) corresponding to the M first CORESETs are configured with a same value.

Optionally, interleaver offsets corresponding to the M first CORESETs are the same.

Optionally, RRC parameters shift index (shiftIndex) corresponding to the M first CORESETs are configured with a same value.

Optionally, RRC parameters CORESET pool index (coresetPoolIndex) corresponding to the M first CORESETs are not configured; or the RRC parameters coresetPoolIndex corresponding to the M first CORESETs are same or different.

Optionally, precoder granularities corresponding to the M first CORESETs are the same.

Optionally, RRC parameters precoder granularity (precoderGranularity) corresponding to the M first CORESETs are configured with a same value.

Optionally, the N first search spaces correspond to a same first CORESET.

Optionally, the first device is a network device or a second terminal device.

Optionally, in downlink control information DCI corresponding to the N first search spaces, a TCI indication field has the same number of bits.

Optionally, the number of bits of the TCI indication field in the DCI corresponding to the N first search spaces is determined according to the TCI indication field corresponding to the first search space with a smallest or largest identifier of the first search space.

Optionally, the number of bits of the TCI indication field in the DCI corresponding to the N first search spaces is determined according to a tci-PresentInDCI field or a tci-PresentDCI-1-2 field in an RRC parameter of the first CORESET corresponding to a second search space, and the second search space is the first search space with the smallest or largest identifier of the first search space.

Optionally, the number of bits of the TCI indication field in the DCI corresponding to the N first search spaces is determined according to the TCI indication field corresponding to the first search space positioned first or last in a corresponding configuration or activation signaling of the first search space.

Optionally, the number of bits of the TCI indication field in the DCI corresponding to the N first search spaces is determined according to a tci-PresentInDCI field or a tci-PresentDCI-1-2 field in an RRC parameter of the first CORESET corresponding to a third search space, and the third search space is the first search space positioned first or last in the corresponding configuration or activation signaling of the first search space.

Optionally, a tci-PresentInDCI or tci-PresentDCI-1-2 in RRC parameters corresponding to the M first CORESETs is configured with a same value, or is not configured.

Optionally, the number of bits of the TCI indication field in the DCI corresponding to the N first search spaces is determined according to according to an RRC parameter configuration in the first CORESET with the smallest or largest identifier among the first CORESETs.

Optionally, the number of bits of the TCI indication field in the DCI corresponding to the M first CORESETs is determined according to a tci-PresentInDCI or tci-PresentDCI-1-2 field in an RRC parameter of a second CORESET, and the second CORESET is the first CORESET with the smallest or largest identifier among the first CORESETs.

Optionally, the N first search spaces correspond to a same number of PDCCH occasion in a same time slot.

Optionally, in configuration values of RRC parameter motoring symbols within slot (monitoringSymbolsWithinSlot) corresponding to the N first search spaces, a number of bits corresponding to value 1 is the same.

Optionally, in the configuration values of the RRC parameter monitoringSymbolsWithinSlot corresponding to the N first search spaces, positions of the bits corresponding to value 1 is interleaved.

Optionally, a number of consecutive symbols (span) corresponding to one PDCCH monitoring occasion in a slot of the N first search spaces is the same.

Optionally, the first device indicates that the N first search spaces are associated through an RRC signaling.

Optionally, RRC parameters corresponding to the N first search spaces are configured with a same group identifier (group id); or, at least one of the N first search spaces indicates associated other first search spaces; or, the first device configures multiple search space lists through a PDCCH Config, and the search spaces at corresponding positions of different search space lists are associated.

Optionally, the first device uses a media access control control unit MAC CE signaling to indicate that the N first search spaces are associated.

Optionally, the MAC CE indicates N first search spaces, then the N search spaces are associated; or, the MAC CE indicates K first search spaces, wherein adjacent N first search spaces are associated, K≥N; or, the MAC CE indicates K first search spaces and indicates a corresponding group, and the first search spaces belonging to the same group are associated.

Optionally, periods corresponding to the N first search spaces are the same, and the time offsets corresponding to the N first search spaces are different.

Optionally, slots caused by the time offsets of the N first search spaces are adjacent, or, no downlink slot is positioned between the corresponding slots caused by the time offsets of the N first search spaces, or, no flexible slot is positioned between the corresponding slots caused by the time offsets of the N first search spaces; or, respective nth PDCCH occasions of the N first search spaces in a same cycle are associated with each other.

Optionally, a PDCCH occasion of the first search space X at slot n is associated with a PDCCH occasion of the first search space Y at slot n', wherein the slot n' is a first one slot after the slot n that has the PDCCH occasion corresponding to the first search space Y.

Optionally, an identity of the first search space X is less than the identity of the first search space Y; or, the identity of the first search space X is greater than the identity of the first search space Y; or, an identity of a CORESET corresponding to the first search space X is smaller than the identity of the CORESET corresponding to the first search space Y; or, the identity of the CORESET corresponding to the first search space X is greater than the identity of the CORESET corresponding to the first search space Y; or, a time domain offset value corresponding to the first search space X is smaller than the time domain offset value corresponding to the first search space Y; or, the time domain offset value corresponding to the first search space X is larger than the time domain offset value corresponding to the first search space Y; or, each first search space in the N first search spaces has only one PDCCH occasion in one slot; or, a configuration value of RRC parameter monitoringSymbolsWithinSlot corresponding to each first search space in the N first search spaces has one bit with value 1.

Optionally, slots having PDCCH occasions corresponding to the N first search spaces are interleaved; or the PDCCH occasion X corresponding to the first search space X is associated with the PDCCH occasion Y corresponding to the first search space Y, wherein no other PDCCH occasion corresponding to the first search space X or the first search space Y is positioned between the PDCCH occasion X and the PDCCH occasion Y; or the PDCCH occasion X corresponding to the first search space X is associated with the PDCCH occasion Y corresponding to the first search space Y, wherein no one or more first slot is positioned between the PDCCH occasion X and the PDCCH occasion Y, and wherein the one or more first slot includes the PDCCH occasion corresponding to the first search space X or the first search space Y; or a value of RRC parameter duration (duration) corresponding to the N first search spaces is 1.

Optionally, periods and time offsets corresponding to the N first search spaces are the same.

Optionally, RRC parameters monitoring slot periods and time offset monitoringSlotPeriodicityAndOffset corresponding to the N first search spaces are configured with a same value; and/or in a configuration value of the RRC parameter monitoringSlotPeriodicityAndOffset corresponding to each first search space of the N first search spaces, a maximum number of bits corresponding to value 1 is 1; and/or in a configuration value of the RRC parameter monitoringSlotPeriodicityAndOffset corresponding to each first search space of the N first search spaces, a maximum number of bits corresponding to value 1 is 2.

Optionally, a number of consecutive slots appearing in the N first search spaces within one cycle is the same.

Optionally, RRC parameter duration corresponding to the N first search spaces is configured with a same value, or the RRC parameter duration corresponding to the N first search spaces is not configured.

Optionally, DCI formats corresponding to the N first search spaces are the same.

Optionally, PDCCH candidates with a same aggregation level L and having a same index are associated with each other.

Optionally, the PDCCHs associated in the N first search spaces indicate same information; and/or, the PDCCHs associated in the N first search spaces indicate a same physical downlink shared channel PDSCH scheduling; and/or, the PDCCHs associated in the N first search spaces indicate a same physical uplink shared channel PUSCH scheduling; and/or, the PDCCHs associated in the N first search spaces indicate a same channel state information CSI report; and/or, the PDCCHs associated in the N first search spaces indicate a same channel sounding reference signal SRS transmission; and/or, the associated PDCCHs in the N first search spaces indicate a same physical random access channel PRACH transmission.

Optionally, all or part of the N first search spaces are used to transmit same DCI.

Figure 6:
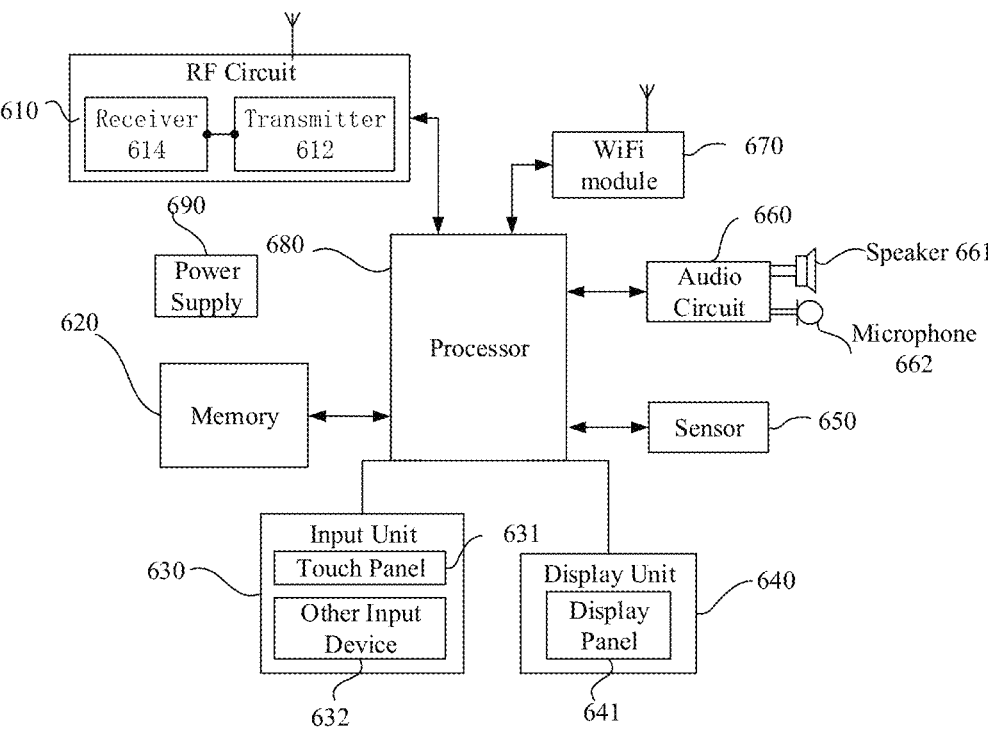
FIG. 6 is a schematic diagram of another embodiment of a terminal device in the embodiment of the present application.

Corresponding to at least one method in the foregoing embodiment that is applied to a terminal device, this embodiment of the present application further provides one or more types of terminal devices. The terminal device in this embodiment of the present application may implement any implementation manner in the foregoing methods. As shown in FIG. 6, it is a schematic diagram of another embodiment of a terminal device in an embodiment of the present disclosure. The terminal device is described by taking a mobile phone as an example, and may include: a radio frequency (RF) circuit 610, a memory 620, an input unit 630, a display unit 640, a sensor 650, an audio circuit 660, a wireless fidelity (WiFi) module 670, a processor 680, and a power supply 690 and other components. Wherein, the radio frequency circuit 610 includes a receiver 614 and a transmitter 612. Those skilled in the art can understand that the structure of the mobile phone shown in FIG. 6 does not constitute a limitation to the mobile phone, and may include more or less components than shown in the figure, or combine some components, or arrange different components.

The following is a specific introduction to each component of the mobile phone in conjunction with FIG. 6.

The RF circuit 610 can be used for sending and receiving information or receiving and sending signals during a call. In particular, after receiving the downlink information of the base station, it is processed by the processor 680; in addition, the designed uplink data is sent to the base station. Generally, the RF circuit 610 includes, but is not limited to, an antenna, at least one amplifier, a transceiver, a coupler, a low noise amplifier (LNA), a duplexer, and the like. In addition, RF circuitry 610 may also communicate with networks and other devices via wireless communications. The above wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS), etc.

The memory 620 can be used to store software programs and modules, and the processor 680 executes various functional applications and data processing of the mobile phone by running the software programs and modules stored in the memory 620. The memory 620 may mainly include a program storage area and a data storage area, wherein the program storage area may store an operating system, at least one application program required by a function (such as a sound playback function, an image playback function, etc.); in addition, the memory 620 may include a high-speed random access memory, and may also include a non-volatile memory, such as at least one magnetic disk storage device, flash memory device, or other volatile solid-state storage devices.

The input unit 630 can be used to receive input numbers or character information, and generate key signal input related to user settings and function control of the mobile phone. Specifically, the input unit 630 may include a touch panel 631 and other input devices 632. The touch panel 631, also called a touch screen, can collect user's touch operations on or near it (for example, the user uses any suitable object or accessory such as a finger or a stylus to operate on the touch panel 631 or near the touch panel 631), and drives the corresponding connection device according to a preset program. Optionally, the touch panel 631 may include two parts, a touch detection device and a touch controller. Wherein, the touch detection device detects the user's touch orientation, detects the signal brought by the touch operation, and transmits the signal to the touch controller; and the touch controller receives the touch information from the touch detection device, converts it into contact coordinates, and then sends it to the processor 680, and can receive and execute commands sent by the processor 680. In addition, the touch panel 631 can be implemented in various types such as resistive, capacitive, infrared, and surface acoustic wave. In addition to the touch panel 631, the input unit 630 may also include other input devices 632. Specifically, other input devices 632 may include, but are not limited to, one or more of physical keyboards, function keys (such as volume control keys, switch keys, etc.), trackballs, mice, joysticks, and the like.

The display unit 640 may be used to display information input by or provided to the user and various menus of the mobile phone. The display unit 640 may include a display panel 641. Optionally, the display panel 641 may be configured in the form of a liquid crystal display (LCD), an organic light-emitting diode (OLED), or the like. Further, the touch panel 631 may cover the display panel 641, and when the touch panel 631 detects a touch operation on or near it, it is sent to the processor 680 to determine the type of the touch event, and then the processor 680 provides corresponding visual output on the display panel 641 according to the type of the touch event. Although in FIG. 6, the touch panel 631 and the display panel 641 are two independent components to realize the input and input functions of the mobile phone, in some embodiments, the touch panel 631 and the display panel 641 can be integrated to realize the input and output functions of the mobile phone.

The mobile phone may also include at least one sensor 650, such as a light sensor, motion sensor, and other sensors. Specifically, the light sensor can include an ambient light sensor and a proximity sensor, wherein the ambient light sensor can adjust the brightness of the display panel 641 according to the brightness of the ambient light, and the proximity sensor can turn off the display panel 641 and/or the backlight when the mobile phone is moved to the ear. As a kind of motion sensor, an accelerometer sensor can detect the magnitude of acceleration in various directions (generally three axes), and can detect the magnitude and direction of gravity when it is still. It can be used to identify the application of mobile phone posture (such as horizontal and vertical screen switching, related games, magnetometer posture calibration), vibration recognition related functions (such as pedometer, tap), etc. As for other sensors such as gyroscopes, barometers, hygrometers, thermometers, and infrared sensors that can also be configured on mobile phones, they will not be described here.

The audio circuit 660, the speaker 661 and the microphone 662 can provide an audio interface between the user and the mobile phone. The audio circuit 660 can transmit the electrical signal converted from the received audio data to the speaker 661, and the speaker 661 converts it into an audio signal for output. On the other hand, the microphone 662 converts the collected sound signal into an electrical signal, which is converted into audio data after being received by the audio circuit 660, and then the audio data is processed by the output processor 680, and then sent to another mobile phone through the RF circuit 610, or the audio data is output to memory 620 for further processing.

WiFi is a short-distance wireless transmission technology. The mobile phone can help users send and receive emails, browse web pages, and access streaming media through the WiFi module 670, which provides users with wireless broadband Internet access. Although FIG. 6 shows a WiFi module 670, it can be understood that it is not an essential component of the mobile phone, and can be completely omitted as required without changing the essence of the invention.

The processor 680 is the control center of the mobile phone. It uses various interfaces and lines to connect various parts of the entire mobile phone. By running or executing software programs and/or modules stored in the memory 620, and calling data stored in the memory 620, it executes various functions of the mobile phone and processes data, so as to monitor the mobile phone as a whole. Optionally, the processor 680 may include one or more processing units; preferably, the processor 680 may integrate an application processor and a modem processor, wherein the application processor mainly processes operating systems, user interfaces, and application programs, and the modem processor mainly processes wireless communications. It can be understood that the foregoing modem processor may not be integrated into the processor 680.

The mobile phone also includes a power supply 690 (such as a battery) for supplying power to various components. Preferably, the power supply can be logically connected to the processor 680 through the power management system, so that functions such as charging, discharging, and power consumption management can be realized through the power management system. Although not shown, the mobile phone may also include a camera, a Bluetooth module, etc., which will not be described here.

In the embodiment of the present disclosure, the RF circuit 610 is configured to receive first configuration information sent by a first device, wherein the first configuration information is configured to indicate N first search spaces, physical downlink control channels PDCCHs corresponding to the N first search spaces are associated with each other, and/or, the N first search spaces are associated with each other, and the N first search spaces correspond to the PDCCH, and wherein N is an integer greater than or equal to 2.

Optionally, each of the first search spaces corresponds to a control resource set CORESET.

Optionally, the N first search spaces correspond to M different first CORESETs, wherein M≤N.

Optionally, active transmission configuration indication states TCI-State corresponding to the M first CORESETs are configured with a same quasi-co-located QCL type.

Optionally, symbol numbers corresponding to the M first CORESETs are the same.

Optionally, PRB positions corresponding to two first CORESETs among the M first CORESETs are different from each other by an offset.

Optionally, PRB numbers corresponding to the M first CORESETs are the same.

Optionally, interleaving types corresponding to the M first CORESETs are the same, or parameters of interleaved parts corresponding to the M first CORESETs are the same.

Optionally, RRC parameters interleave (interleaved) corresponding to the M first CORESETs are configured with a same value.

Optionally, the M first CORESETs are interleaved.

Optionally, resource unit group bundle sizes corresponding to the M first CORESETs are the same.

Optionally, RRC parameters resource group bundle size (reg-BundleSize) corresponding to the M first CORESETs are configured with a same value.

Optionally, interleaver size values corresponding to the M first CORESETs are the same.

Optionally, RRC parameters interleaver size (interleaverSize) corresponding to the M first CORESETs are configured with a same value.

Optionally, interleaver offsets corresponding to the M first CORESETs are the same.

Optionally, RRC parameters shift index (shiftIndex) corresponding to the M first CORESETs are configured with a same value.

Optionally, RRC parameters CORESET pool index (coresetPoolIndex) corresponding to the M first CORESETs are not configured; or the RRC parameters coresetPoolIndex corresponding to the M first CORESETs are same or different.

Optionally, precoder granularities corresponding to the M first CORESETs are the same.

Optionally, RRC parameters precoder granularity (precoderGranularity) corresponding to the M first CORESETs are configured with a same value.

Optionally, the N first search spaces correspond to a same first CORESET.

Optionally, the first device is a network device or a second terminal device.

Optionally, in downlink control information DCI corresponding to the N first search spaces, a TCI indication field has the same number of bits.

Optionally, the number of bits of the TCI indication field in the DCI corresponding to the N first search spaces is determined according to the TCI indication field corresponding to the first search space with a smallest or largest identifier of the first search space.

Optionally, the number of bits of the TCI indication field in the DCI corresponding to the N first search spaces is determined according to a tci-PresentInDCI field or a tci-PresentDCI-1-2 field in an RRC parameter of the first CORESET corresponding to a second search space, and the second search space is the first search space with the smallest or largest identifier of the first search space.

Optionally, the number of bits of the TCI indication field in the DCI corresponding to the N first search spaces is determined according to the TCI indication field corresponding to the first search space positioned first or last in a corresponding configuration or activation signaling of the first search space.

Optionally, the number of bits of the TCI indication field in the DCI corresponding to the N first search spaces is determined according to a tci-PresentInDCI field or a tci-PresentDCI-1-2 field in an RRC parameter of the first CORESET corresponding to a third search space, and the third search space is the first search space positioned first or last in the corresponding configuration or activation signaling of the first search space.

Optionally, a tci-PresentInDCI or tci-PresentDCI-1-2 in RRC parameters corresponding to the M first CORESETs is configured with a same value, or is not configured.

Optionally, the number of bits of the TCI indication field in the DCI corresponding to the N first search spaces is determined according to according to an RRC parameter configuration in the first CORESET with the smallest or largest identifier among the first CORESETs.

Optionally, the number of bits of the TCI indication field in the DCI corresponding to the M first CORESETs is determined according to a tci-PresentInDCI or tci-PresentDCI-1-2 field in an RRC parameter of a second CORESET, and the second CORESET is the first CORESET with the smallest or largest identifier among the first CORESETs.

Optionally, the N first search spaces correspond to a same number of PDCCH occasion in a same time slot.

Optionally, in configuration values of RRC parameter motoring symbols within slot (monitoringSymbolsWithinSlot) corresponding to the N first search spaces, a number of bits corresponding to value 1 is the same.

Optionally, in the configuration values of the RRC parameter monitoringSymbolsWithinSlot corresponding to the N first search spaces, positions of the bits corresponding to value 1 is interleaved.

Optionally, a number of consecutive symbols (span) corresponding to one PDCCH monitoring occasion in a slot of the N first search spaces is the same.

Optionally, the first device indicates that the N first search spaces are associated through an RRC signaling.

Optionally, RRC parameters corresponding to the N first search spaces are configured with a same group identifier (group id); or, at least one of the N first search spaces indicates associated other first search spaces; or, the first device configures multiple search space lists through a PDCCH Config, and the search spaces at corresponding positions of different search space lists are associated.

Optionally, the first device uses a media access control control unit MAC CE signaling to indicate that the N first search spaces are associated.

Optionally, the MAC CE indicates N first search spaces, then the N search spaces are associated; or, the MAC CE indicates K first search spaces, wherein adjacent N first search spaces are associated, K≥N; or, the MAC CE indicates K first search spaces and indicates a corresponding group, and the first search spaces belonging to the same group are associated.

Optionally, periods corresponding to the N first search spaces are the same, and the time offsets corresponding to the N first search spaces are different.

Optionally, slots caused by the time offsets of the N first search spaces are adjacent, or, no downlink slot is positioned between the corresponding slots caused by the time offsets of the N first search spaces, or, no flexible slot is positioned between the corresponding slots caused by the time offsets of the N first search spaces; or, respective nth PDCCH occasions of the N first search spaces in a same cycle are associated with each other.

Optionally, a PDCCH occasion of the first search space X at slot n is associated with a PDCCH occasion of the first search space Y at slot n', wherein the slot n' is a first one slot after the slot n that has the PDCCH occasion corresponding to the first search space Y.

Optionally, an identity of the first search space X is less than the identity of the first search space Y; or, the identity of the first search space X is greater than the identity of the first search space Y; or, an identity of a CORESET corresponding to the first search space X is smaller than the identity of the CORESET corresponding to the first search space Y; or, the identity of the CORESET corresponding to the first search space X is greater than the identity of the CORESET corresponding to the first search space Y; or, a time domain offset value corresponding to the first search space X is smaller than the time domain offset value corresponding to the first search space Y; or, the time domain offset value corresponding to the first search space X is larger than the time domain offset value corresponding to the first search space Y; or, each first search space in the N first search spaces has only one PDCCH occasion in one slot; or, a configuration value of RRC parameter monitoringSymbolsWithinSlot corresponding to each first search space in the N first search spaces has one bit with value 1.

Optionally, slots having PDCCH occasions corresponding to the N first search spaces are interleaved; or the PDCCH occasion X corresponding to the first search space X is associated with the PDCCH occasion Y corresponding to the first search space Y, wherein no other PDCCH occasion corresponding to the first search space X or the first search space Y is positioned between the PDCCH occasion X and the PDCCH occasion Y; or the PDCCH occasion X corresponding to the first search space X is associated with the PDCCH occasion Y corresponding to the first search space Y, wherein no one or more first slot is positioned between the PDCCH occasion X and the PDCCH occasion Y, and wherein the one or more first slot includes the PDCCH occasion corresponding to the first search space X or the first search space Y; or a value of RRC parameter duration (duration) corresponding to the N first search spaces is 1.

Optionally, periods and time offsets corresponding to the N first search spaces are the same.

Optionally, RRC parameters monitoring slot periods and time offset monitoringSlotPeriodicityAndOffset corresponding to the N first search spaces are configured with a same value; and/or in a configuration value of the RRC parameter monitoringSlotPeriodicityAndOffset corresponding to each first search space of the N first search spaces, a maximum number of bits corresponding to value 1 is 1; and/or in a configuration value of the RRC parameter monitoringSlotPeriodicityAndOffset corresponding to each first search space of the N first search spaces, a maximum number of bits corresponding to value 1 is 2.

Optionally, a number of consecutive slots appearing in the N first search spaces within one cycle is the same.

Optionally, RRC parameter duration corresponding to the N first search spaces is configured with a same value, or the RRC parameter duration corresponding to the N first search spaces is not configured.

Optionally, DCI formats corresponding to the N first search spaces are the same.

Optionally, PDCCH candidates with a same aggregation level L and having a same index are associated with each other.

Optionally, the PDCCHs associated in the N first search spaces indicate same information; and/or, the PDCCHs associated in the N first search spaces indicate a same physical downlink shared channel PDSCH scheduling; and/or, the PDCCHs associated in the N first search spaces indicate a same physical uplink shared channel PUSCH scheduling; and/or, the PDCCHs associated in the N first search spaces indicate a same channel state information CSI report; and/or, the PDCCHs associated in the N first search spaces indicate a same channel sounding reference signal SRS transmission; and/or, the associated PDCCHs in the N first search spaces indicate a same physical random access channel PRACH transmission.

Optionally, all or part of the N first search spaces are used to transmit same DCI.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, all or part of the processes or functions according to the embodiments of the present disclosure will be implemented. The computer can be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from one website, computer, server or data center to another website, computer, server or data center through wired (such as coaxial cable, optical fiber, digital subscriber line (DSL)) or wireless (such as infrared, wireless, microwave, etc.) means. The computer-readable storage medium may be any available medium that can be stored by a computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a solid state disk (SSD)).

The terms "first", "second", "third", "fourth", etc. (if any) in the description and claims of the present disclosure and the above drawings are used to distinguish similar objects and not necessarily to describe a specific order or sequence. It is to be understood that the terms so used are interchangeable under appropriate circumstances such that the embodiments described herein can be practiced in sequences other than those illustrated or described herein. Furthermore, the terms "comprising" and "having", and any variations thereof, are intended to cover non-exclusive inclusion, for example, a process, method, system, product or device comprising a series of steps or elements is not necessarily limited to those steps or elements explicitly listed, but may include other steps or elements not expressly listed or inherent to the process, method, product or device.

What is claimed is:

1. A physical downlink control channel (PDCCH) configuration method, comprising:

receiving, by a first terminal device, first configuration information sent by a network device through a radio resource control (RRC) signaling, wherein the first configuration information is configured to indicate N first search spaces, wherein the N first search spaces are associated with each other, and the N first search spaces correspond to the PDCCH, and wherein N is an integer greater than or equal to 2, wherein each of the first search spaces corresponds to a control resource set (CORESET), and the N first search spaces correspond to M different first CORESETs, wherein M≤N, and the wherein RRC parameters CORESET pool index (coresetPoolindex) corresponding to the M first CORESETs are not configured; or the RRC parameters coresetPoolindex corresponding to the M first CORESETs are the same, wherein in downlink control information (DCI) corresponding to the N first search spaces, a transmission configuration indicator (TCI) indication field has the same number of bits, and wherein a tci-PesentInDCI in RRC parameters corresponding to the M first CORESETs is configured with a same value, or is not configured.

2. The method according to claim 1, wherein the N first search spaces satisfy at least one of:

the N first search spaces correspond to a same number of PDCCH occasion in a same time slot;

wherein periods and time offsets corresponding to the N first search spaces are the same;

wherein a number of consecutive slots appearing in the N first search spaces within one cycle is the same; or wherein DCI formats corresponding to the N first search spaces are the same.

3. The method according to claim 2, wherein:

RRC parameters monitoring slot periods and time offset monitoringSlotPeriodicityAndOffset corresponding to the N first search spaces are configured with a same value; and/or in a configuration value of the RRC parameter monitoringSlotPeriodicityAndOffset corresponding to each first search space of the N first search spaces, a maximum number of bits corresponding to value 1 is 1; and/or in a configuration value of the RRC parameter monitoringSlotPeriodicityAndOffset corresponding to each first search space of the N first search spaces, a maximum number of bits corresponding to value 1 is 2.

4. The method according to claim 2, wherein RRC parameter duration corresponding to the N first search spaces is configured with a same value, or the RRC parameter duration corresponding to the N first search spaces is not configured.

5. The method according to claim 1, wherein RRC parameters corresponding to the N first search spaces are configured with a same group identifier (group id); or, at least one of the N first search spaces indicates associated other first search spaces; or, the first device configures multiple search space lists through a PDCCH Config, and the search spaces at corresponding positions of different search space lists are associated.

6. The method according to claim 1, wherein PDCCH candidates with a same aggregation level L and having a same index are associated with each other.

7. The method according to claim 1, wherein all or part of the N first search spaces are used to transmit same DCI.

8. A terminal device, comprising:

a memory storing executable program code; and a transceiver and a processor coupled to the memory;

the processor is configured to call and run the executable program code stored in the memory to cause the transceiver to receive first configuration information sent by a network device through a radio resource control (RRC) signaling, wherein the first configuration information is configured to indicate N first search spaces, wherein the N first search spaces are associated with each other, and the N first search spaces correspond to a physical downlink control channel (PDCCH), and wherein N is an integer greater than or equal to 2, wherein each of the first search spaces corresponds to a control resource set (CORESET), and the N first search spaces correspond to M different first CORESETs, wherein M≤N, and the wherein RRC parameters CORESET pool index (coresetPoolindex) corresponding to the M first CORESETs are not configured; or the RRC parameters coresetPoolindex corresponding to the M first CORESETs are the same, wherein in downlink control information (DCI) corresponding to the N first search spaces, a transmission configuration indicator (TCI) indication field has the same number of bits, and wherein a tci-PesentInDCI in RRC parameters corresponding to the M first CORESETs is configured with a same value, or is not configured.

9. The terminal device according to claim 8, wherein the N first search spaces satisfy at least one of:

the N first search spaces correspond to a same number of PDCCH occasion in a same time slot;

periods and time offsets corresponding to the N first search spaces are the same;

a number of consecutive slots appearing in the N first search spaces within one cycle is the same; or DCI formats corresponding to the N first search spaces are the same.

10. The terminal device according to claim 9, wherein:

RRC parameters monitoring slot periods and time offset monitoringSlotPeriodicityAndOffset corresponding to the N first search spaces are configured with a same value; and/or in a configuration value of the RRC parameter monitoringSlotPeriodicityAndOffset corresponding to each first search space of the N first search spaces, a maximum number of bits corresponding to value 1 is 1; and/or in a configuration value of the RRC parameter monitoringSlotPeriodicityAndOffset corresponding to each first search space of the N first search spaces, a maximum number of bits corresponding to value 1 is 2.

11. The terminal device according to claim 9, wherein RRC parameter duration corresponding to the N first search spaces is configured with a same value, or the RRC parameter duration corresponding to the N first search spaces is not configured.

12. The terminal device according to claim 8, wherein RRC parameters corresponding to the N first search spaces are configured with a same group identifier (group id); or, at least one of the N first search spaces indicates associated other first search spaces; or, the first device configures multiple search space lists through a PDCCH Config, and the search spaces at corresponding positions of different search space lists are associated.

13. The terminal device according to claim 8, wherein PDCCH candidates with a same aggregation level L and having a same index are associated with each other.

\* \* \* \* \*